United States Patent [19]

Masuda

[11] Patent Number: 4,556,310
[45] Date of Patent: Dec. 3, 1985

[54] COPYING OR PRINTING APPARATUS

[75] Inventor: Shunichi Masuda, Tokyo, Japan

[73] Assignee: Canon Kabushiki Kaisha, Tokyo, Japan

[21] Appl. No.: 556,149

[22] Filed: Nov. 28, 1983

Related U.S. Application Data

[63] Continuation of Ser. No. 267,706, May 28, 1981, abandoned.

[30] Foreign Application Priority Data

Jun. 3, 1980 [JP] Japan .................................. 55-74520
Jun. 4, 1980 [JP] Japan .................................. 55-75263
Jul. 21, 1980 [JP] Japan .................................. 55-99550
Jul. 21, 1980 [JP] Japan .................................. 55-99551
Oct. 9, 1980 [JP] Japan .................................. 55-141192

[51] Int. Cl.$^4$ ............................................. G03G 15/00
[52] U.S. Cl. .................................. 355/14 R; 355/14 C
[58] Field of Search ......................... 355/14 C, 14 R; 364/130, 131, 132, 900, 200, 133, 134, 525; 219/216

[56] References Cited

U.S. PATENT DOCUMENTS

| | | | |
|---|---|---|---|
| 4,188,668 | 2/1980 | Finlay | 364/900 |
| 4,227,798 | 10/1980 | Steiner | 355/14 C |
| 4,259,565 | 3/1981 | Oging et al. | 219/216 |
| 4,280,763 | 7/1981 | Arai et al. | 355/14 R |
| 4,283,773 | 8/1981 | Daughton et al. | 364/132 |
| 4,306,803 | 12/1981 | Donohue et al. | 355/14 C |
| 4,314,334 | 2/1982 | Daughton et al. | 364/200 |
| 4,478,509 | 10/1984 | Daughton et al. | 355/14 C |

Primary Examiner—A. C. Prescott
Attorney, Agent, or Firm—Fitzpatrick, Cella, Harper & Scinto

[57] ABSTRACT

There is disclosed a copying or printing apparatus utilizing sequence control with micro-computer and capable of preventing erroneous function at the start of power supply. The apparatus is provided with plural processors for image reproduction, a controller for controlling some of the processors and switch for power supply for energizing the controller and the processors. The controller is reset in response to the actuation of said power supply switch, and then said processors are energized.

17 Claims, 45 Drawing Figures

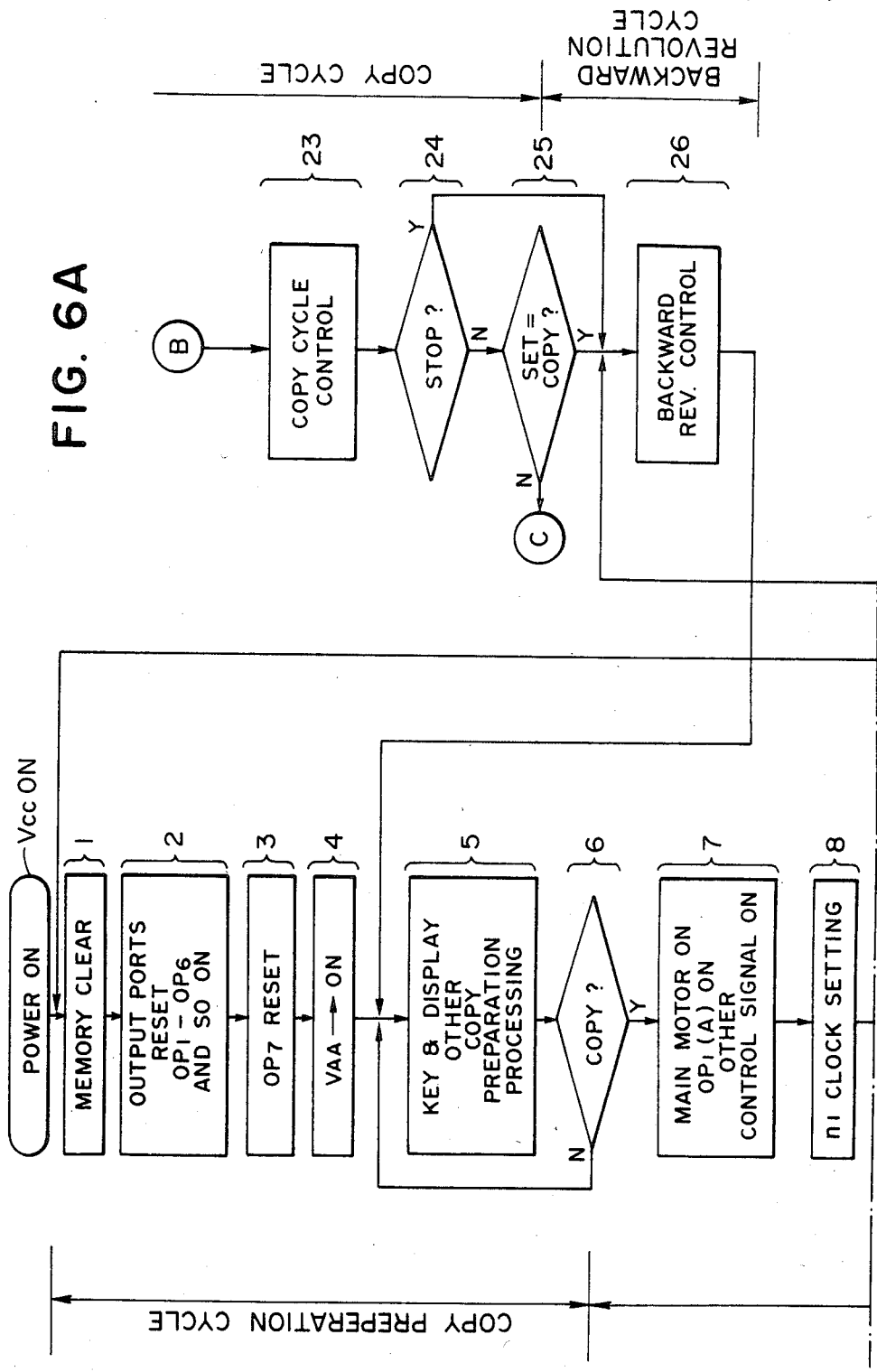

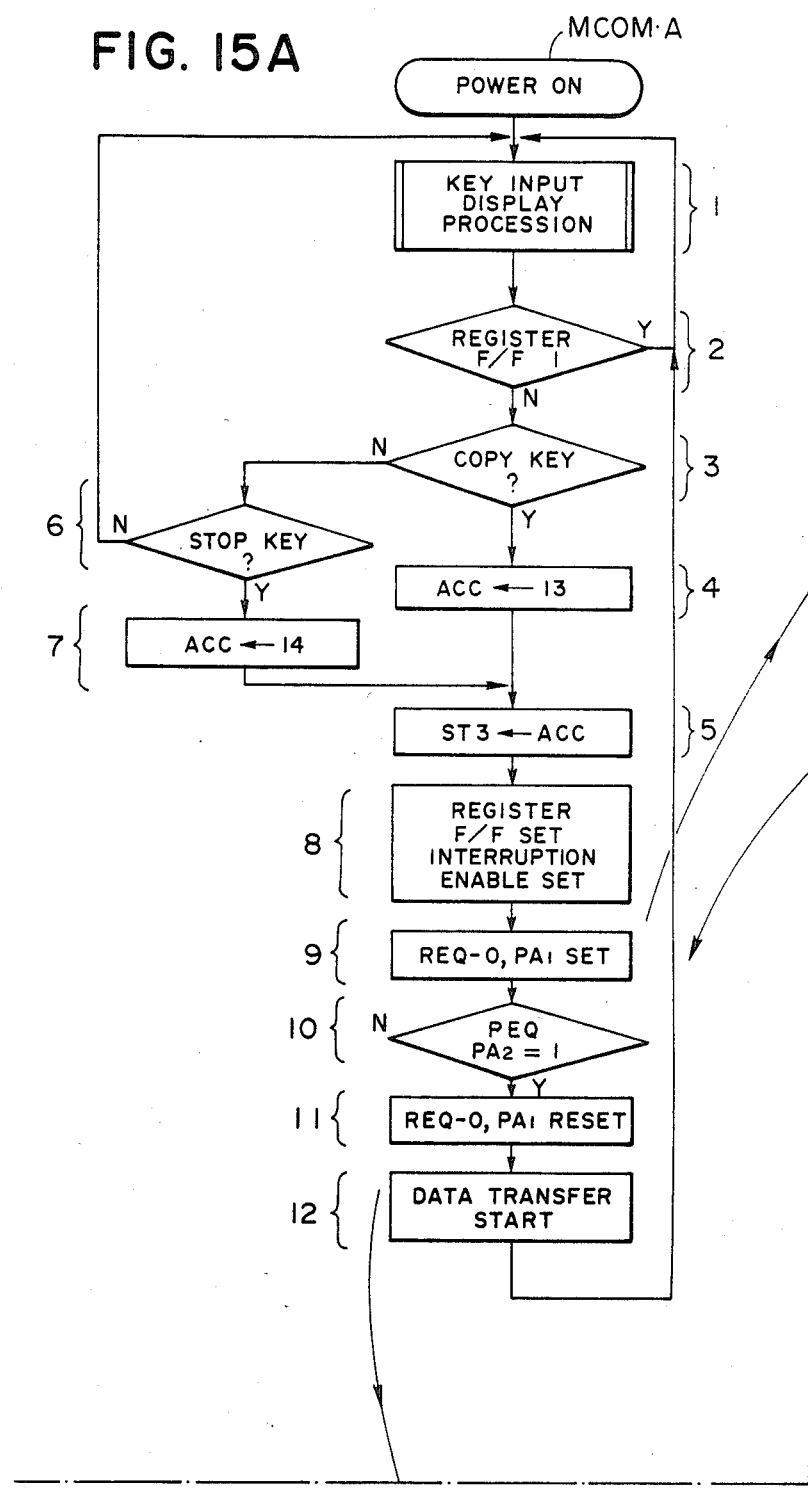

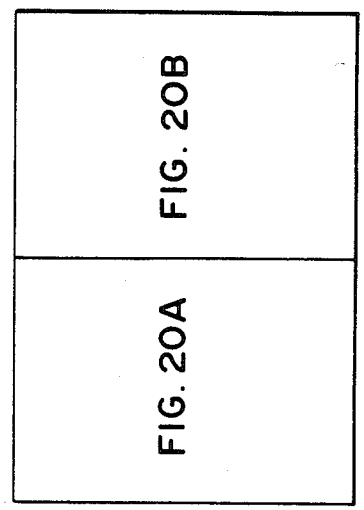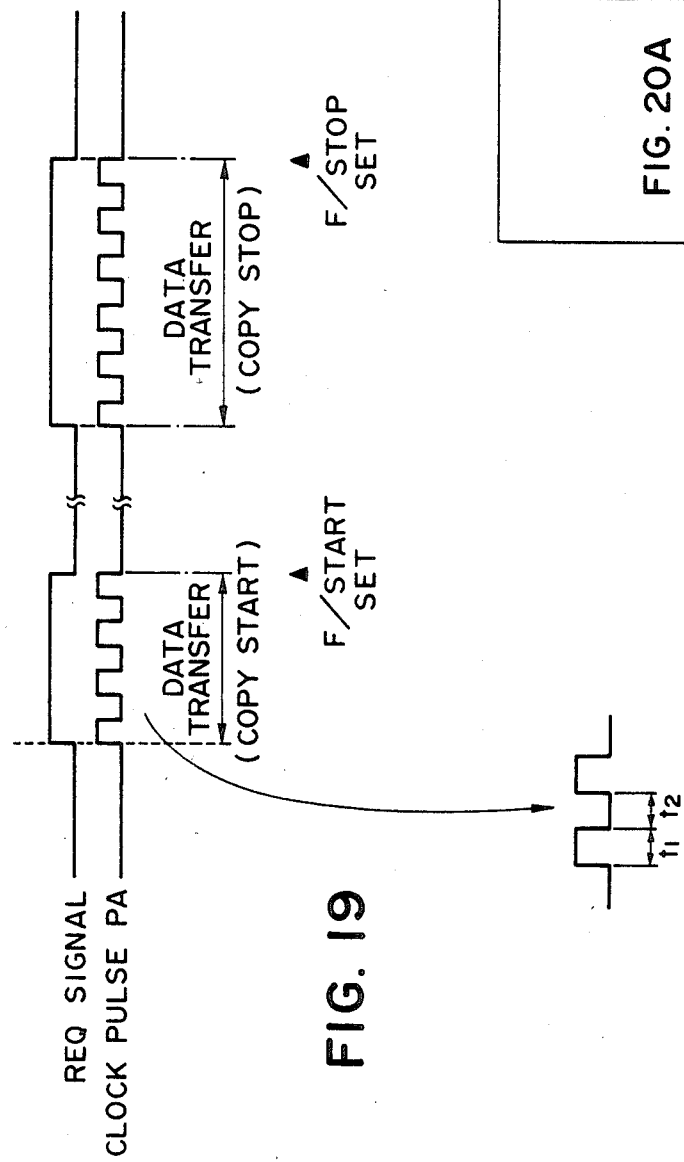

COPYING OR PRINTING APPARATUS

BACKGROUND OF THE INVENTION

1. Field of the Invention

This is a continuation of application Ser. No. 267,706 filed May 28, 1981, now abandoned.

The present invention relates to a reproducing apparatus such as a copier having an improved controller, and more particularly to a copier control system utilizing a control unit having a program memory such as a micro-computer or a micro-processor for copying operation control, and further to a control system utilizing plural micro-processors or micro-computers.

2. Description of the Prior Art

The use of micro-processors or micro-computers for controlling copiers is becoming common for achieving higher performance, higher speed and multiple functions therein, and this tendency has resulted in a marked decrease in the hardware logic elements in the control circuits. In general various drive means such as clutches or plungers for copying control are activated by driver circuits connected directly to the output ports of the control element such as a micro-computer, and such drive method is often associated with certain drawbacks.

The micro-computers are generally classified into the N-channel process type and the P-channel process type, according to the structure in the semi-conductor constituting the micro-computer. FIGS. 1(a) and 1(b) respectively show the output ports of the micro-computers of the N-channel process type and of the P-channel process type.

Upon turning on of the main switch, power supply is generally initiated simultaneously to the apparatus and to the micro-computer. The transistors Tr connected to the output ports of the micro-computer are generally of open-drain type, and the power-on resetting is achieved by turning off said transistor and resetting the ports through the program.

For example in a micro-computer of the N-channel process type there is provided, as shown in FIG. 1(a), a pull-up resistor Ra connected to the power supply voltage Vcc for the micro-computer, and the driver circuit is generally composed of a transistorized Darlington circuit as shown in FIG. 1(c).

Therefore, in the use of a micro-computer of N-channel process for controller, when said transistor is turned off at power-on resetting, said pull-up resistor Ra supplies a current to the driver circuit to activate the process means.

In case of a micro-computer of P-channel process the load resistor can be constituted by a resistor in the driver circuit, but the premature activation of the process means may occur if the transistor at the output port is turned on by failure of the power-on resetting.

Such phenomenon is extremely dangerous as all the process means may be simultaneously activated when the power supply is turned on.

Also in the conventional copying sequence control, the micro-computer controls various process means by counting clock pulses generated in synchronization with the rotation of the photosensitive drum. In such system, if the clock pulse entry to the micro-computer is interrupted during the sequence control for some reason, such as a failure in the pulse generator, an incomplete contact of the connector etc., the program remains in the clock counting routine and cannot proceed to the next step, thus interrupting the sequence. In order to prevent such phenomenon the micro-computer inspects the entry of clock pulses and, in case of an abnormality, resets all the output ports to terminate the function of the apparatus through a program, but such measure requires a complicated programming.

Also the copier is generally provided with a cooling blower for cooling the original supporting carriage, exposure lamp, micro-computer etc. Otherwise the carriage may be broken due to the temperature rise after prolonged use or the micro-computer may function erroneously due to abnormally high temperature. There still exists a danger, however, in the case of prolonged continuous copying, in case the cooling blower is stopped or deteriorated, or in case the exposure lamp is continuously lighted for some reason.

Furthermore, the advanced and multiple functions and high speed required in recent copiers has reached a stage of being more easily achievable with plural micro-computers or micro-processors for separate controls rather than by a single micro-computer.

However, due to the absence of an external data bus line in the so-called one-chip micro-computer having the program memory, data memory, input/output ports and processor on a single semi-conductor chip, the data transmission between the micro-computers has to be conducted through the input/output lines. Such control system will require an elevated number of input/output ports for data transmission as the number of process means and display devices increases to cope with the multiple functions of the copier, and in addition will involve a highly complex program for operation and display control.

SUMMARY OF THE INVENTION

The object of the present invention is to provide a copying or printing apparatus not associated with the aforementioned drawbacks.

Another object of the present invention is to provide a copying or printing apparatus having an improved controller with increased safety.

Still another object of the present invention is to provide a copying or printing apparatus utilizing sequence control with micro-computer and capable of preventing erroneous functioning at the start of power supply.

Still another object of the present invention is to provide a copier having plural process means for reproducing an image on a recording material, means for driving said process means, and means for controlling the function of said drive means, wherein the power supply to said drive means is so controlled that the function of said process means is enabled at the start of power supply after said control means is reset.

Still another object of the present invention is to provide an apparatus which is sequence controlled by a micro-computer and serial pulses, wherein the erroneous function resulting from an abnormality in said pulses can be securely and effectively prevented.

Still another object of the present invention is to provide a copier having means for detecting serial pulses for timing control and a micro-computer for controlling process means and capable, in case of an abnormality in said pulses, of turning off the power supply to said process means and continuing the power supply to said computer.

Still another object of the present invention is to provide a copier capable of securely and effectively preventing damage or erroneous functioning in the micro-computer, exposure means etc. resulting from an abnormal temperature rise in the apparatus.

Still another object of the present invention is to provide a copier having means for monitoring the function of at least one of the exposure means and cooling means such as a fan, said monitoring means being adapted, in response to a detected abnormality, to interrupt the power supply at least to said exposure means and preferably to the drive means, thereby disabling the function of the copier, while maintaining the power supply to the micro-computer controlling the function of the exposure means, fan etc.

Still another object of the present invention is to provide a copying or printing apparatus utilizing plural micro-computers for various control functions, wherein the number of input/output ports between said micro-computers is maintained at a minimum.

Still another object of the present invention is to provide a copier capable of transmitting the data for copying control in the form of serial pulses from a micro-computer to another micro-computer, and effecting copy and display control according to said serial pulses.

Still another object of the present invention is to provide a copier control process and system with plural micro-computers, wherein a micro-computer effects the control for key entry, display etc. and serially transmits plural signals for copying control to another micro-computer, which performs further copying control in response to the thus transmitted signals, and wherein said other micro-computer serially transmits other plural signals for copying control to the micro-computer mentioned first.

Still another object of the present invention is to provide a system for shared control of various functions of a copier by plural micro-computers, wherein the data transmitted between the micro-computers are in a form of serial pulses and are supplied to an interrupt port or an event counter port of another micro-computer, and various controls are effected according to the mode, for example number, of the pulses thus transmitted.

Still another object of the present invention is to provide a data transmission system between a reproducing apparatus equipped with a micro-computer and peripheral equipment such as an automatic document feeder or sorter similarly having a micro-computer, wherein the input/output ports required for data transmission are minimized in number while enabling effective and efficient data transmission.

The foregoing and still other objects of the present invention will be clarified in detail by the following description of the preferred embodiments.

BRIEF DESCRIPTION OF THE DRAWINGS

FIG. 1(a) is a circuit diagram showing the output port of a micro-computer of N-channel type;

FIG. 1(b) is a circuit diagram showing the output port of a micro-computer of P-channel type;

FIG. 1(c) is a circuit diagram of a driver circuit;

FIG. 2-2 is a plan view of the control panel thereof;

FIG. 3-1 illustrates a connecting relationship between FIGS. 3-1A and 3-1B;

FIGS. 3-1A, 3-1B and 3-2 are circuit diagrams showing examples of the control circuit adapted for use in the apparatus shown in FIG. 2-1;

FIG. 19 is a timing chart showing the data transfer between the micro-computers;

FIG. 20 illustrates a connecting relation between FIGS. 20A and 20B;

DESCRIPTION OF THE PREFERRED EMBODIMENTS

Now the present invention will be clarified in detail by the following description of the preferred embodiments thereof to be taken in conjunction with the attached drawings.

Figures 1, 2:
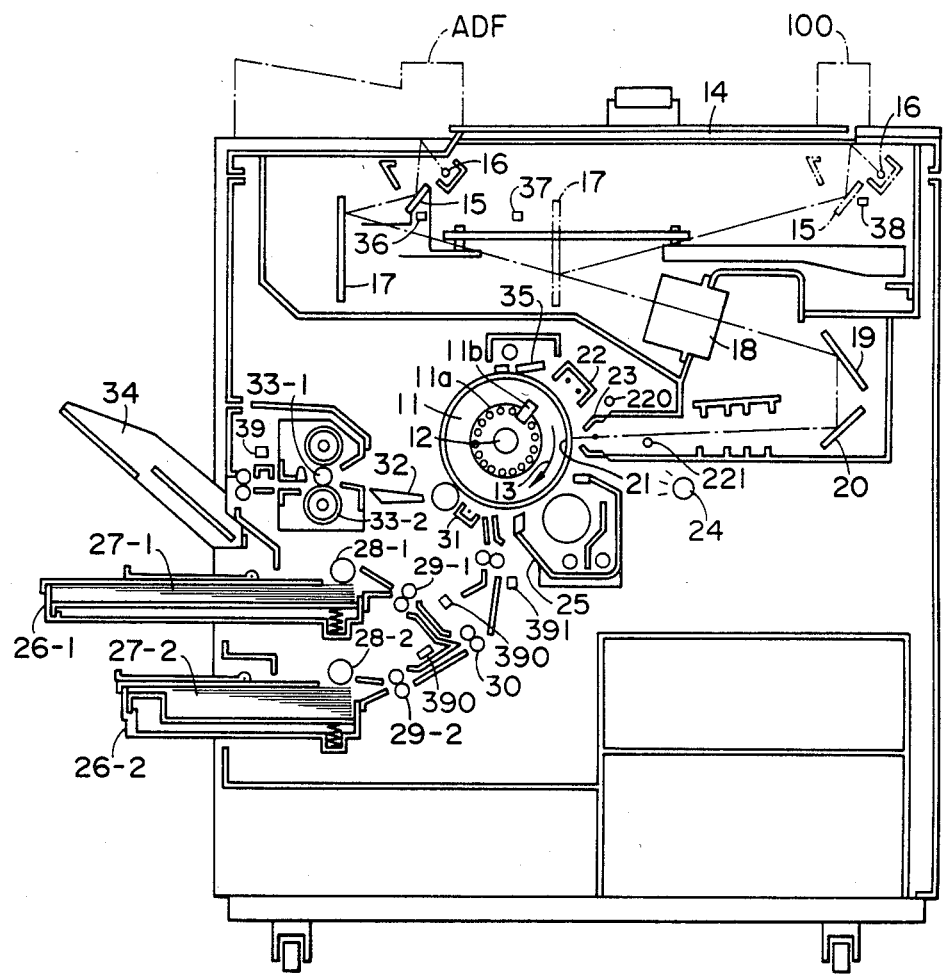
Figure 2:
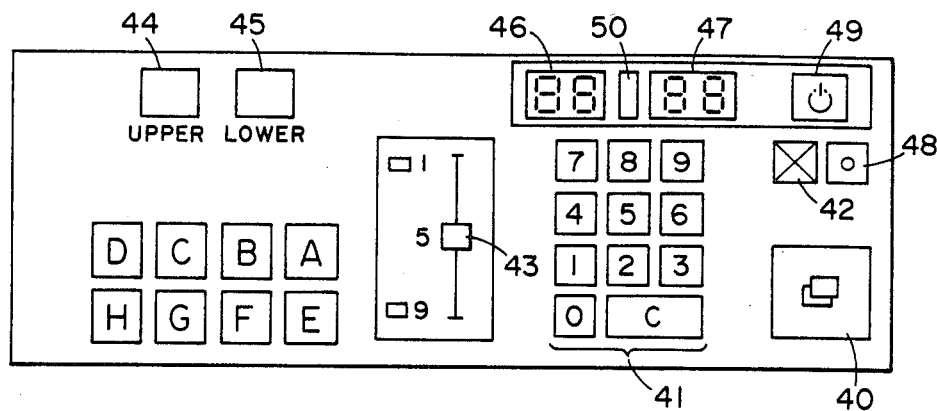

FIG. 2 shows, in a cross-sectional view, a copier in which the present invention is applicable, wherein a rotary drum 11, provided on the periphery thereof with a three-layered photosensitive member utilizing a CdS photoconductor, is rotatably supported on a shaft 12 and initiates rotation in a direction of arrow 13 in response to a copy instruction signal.

Upon arrival of said drum 11 at a determined position, an original placed on an original supporting glass plate or carriage 14 is illuminated by an illuminating lamp 16 structured as an integral unit with a first scanning mirror 15; and the reflected light is received by said first scanning mirror 15 and a second scanning mirror 17, which are displaced at a speed ratio of 1:½ to effect the scanning of said original while maintaining a constant optical path length in front of a lens 18.

The optical image thus reflected is transmitted through said lens 18, a third mirror 19 and a fourth mirror 20 and focused onto said drum 11 in an exposure station 21.

The drum 11 is at first charged, for example positively, by a primary charger 22, and then subjected to slit exposure of the above-mentioned image from the lamp 16 in said exposure station 21.

The drum is subjected to an AC charge elimination or a charge elimination of a polarity opposite to that of said primary charging by means of a charge eliminator 23 and simultaneously with said image exposure, and subsequently flush exposure to a whole surface exposure lamp 24 to form an electrostatic latent image of an elevated contrast on said drum 11. Said latent image is subsequently rendered visible as a toner image in a developing station 25.

A transfer sheet 27-1 or 27-2 stored in a cassette 26-1 or 26-2 is supplied into the apparatus by a feed roller 28-1 or 28-2, then advanced at an approximate timing controlled by a first register roller 29-1 or 29-2, and supplied toward the drum 11 with an exact timing achieved by a second register roller 30 which is controlled by a signal from a switch S4 for detecting a determined position of the optical system.

The toner image on the drum 11 is transferred onto said transfer sheet during the passage thereof between the drum 11 and a transfer charger 31.

After the image transfer, the transfer sheet is guided through a conveyor belt 32 to paired fixing rollers 33-1, 33-2 for image fixation by heat and pressure, and is thereafter ejected to a tray 34.

The drum 11 after the image transfer is cleaned in a cleaning station 35 composed of an elastic blade, and proceeds to the succeeding imaging cycle.

In order to control the steps of the above-explained imaging cycle, drum clock pulses DCK are generated by a clock disk 11a rotating integrally with said drum 11 and a sensor 11b for detecting the clock dots provided on said disk.

Also, the above-explained apparatus is capable of repeated copying in a shorter time without the reciprocating movement of the optical system 15-17, by providing a drum attachment 100 around which a sheet original is wound. Also an enlarged or reduced copying is rendered possible by modifying the scanning speed of the optical system and the lens position.

Figure 5:
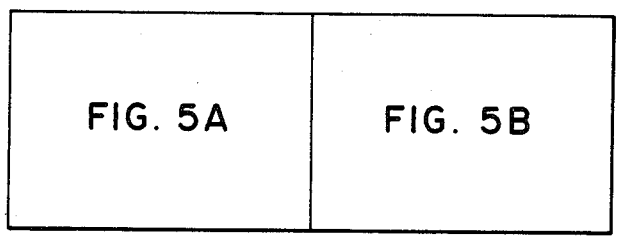
FIG. 5 illustrates a connecting relation between FIGS. 5A and 5B which show in their combination a timing chart.

There is also shown a switch 36 for releasing a signal OHP upon detection of the presence of the optical system in a home position; a switch 37 for detecting a registering position and releasing a signal S4 for controlling the second register roller 30; a switch 38 for detecting a rapid reversing position of the optical system and releasing a signal BHP upon actuation by the first mirror; a sheet sensor 39 for detecting sheet jamming in the fixing station and releasing a corresponding signal S3; and sheet sensors 390, 391 for detecting erroneous sheet feeding and sheet jamming prior to image transfer and releasing corresponding signals S1 and S2. The operation timings of these switches are shown in FIG. 5. Said switch 390 may also be positioned between the first register roller 29 and the feed roller 28.

Figure 1:
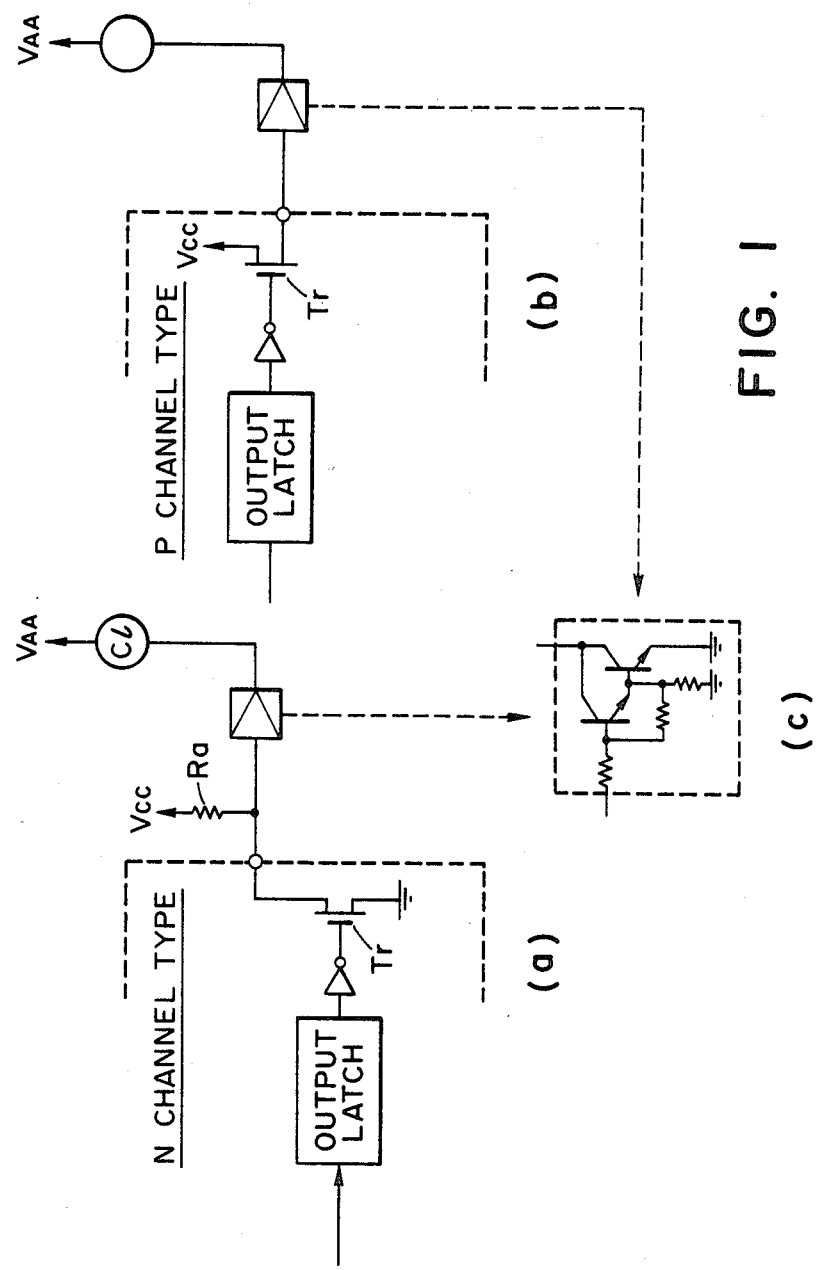
FIG. 2-1 is a cross-sectional view of a copier in which the present invention is applicable.

FIG. 2-2 is a plan view of the control panel of the copier shown in FIG. 2-1, showing a key 40 for starting the copying operation; numeral keys (0-9) and a clear key (C) 41 for setting and resetting the copy number; a stop key 42 for interrupting the repeated copying operation; a slide resistor 43 for adjusting the copy density; keys 44, 45 for selecting the sheet supply from the cassette 26-1 or 26-2; display units 46, 47 each composed of two-digit 7-segment LED display elements and respectively displaying the set copy number selected by the numeral keys 41 and the copy count number or the number of completed copies. The clear key C, if actuated during the course of a repeated copying operation, will interrupts said copying operation and cancels the remaining number of copying operations, whereas the stop key 42, if actuated in a similar manner, will merely interrupt the copying operation which can subsequently be continued to the completion. A cut-in key 48, if actuated during the interruption by said stop key 42, stores the numbers relating to the interrupted copying operation displayed on the display units 46, 47 in other memory areas, displays number "1" and "0" on said display units and enables a second copying operation for a desired number of copies, after which the interrupted first copying operation can be restarted.

Figures 1, 3:
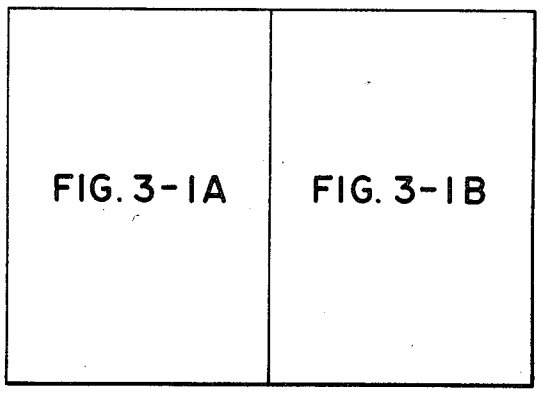
Figures 1A, 3:
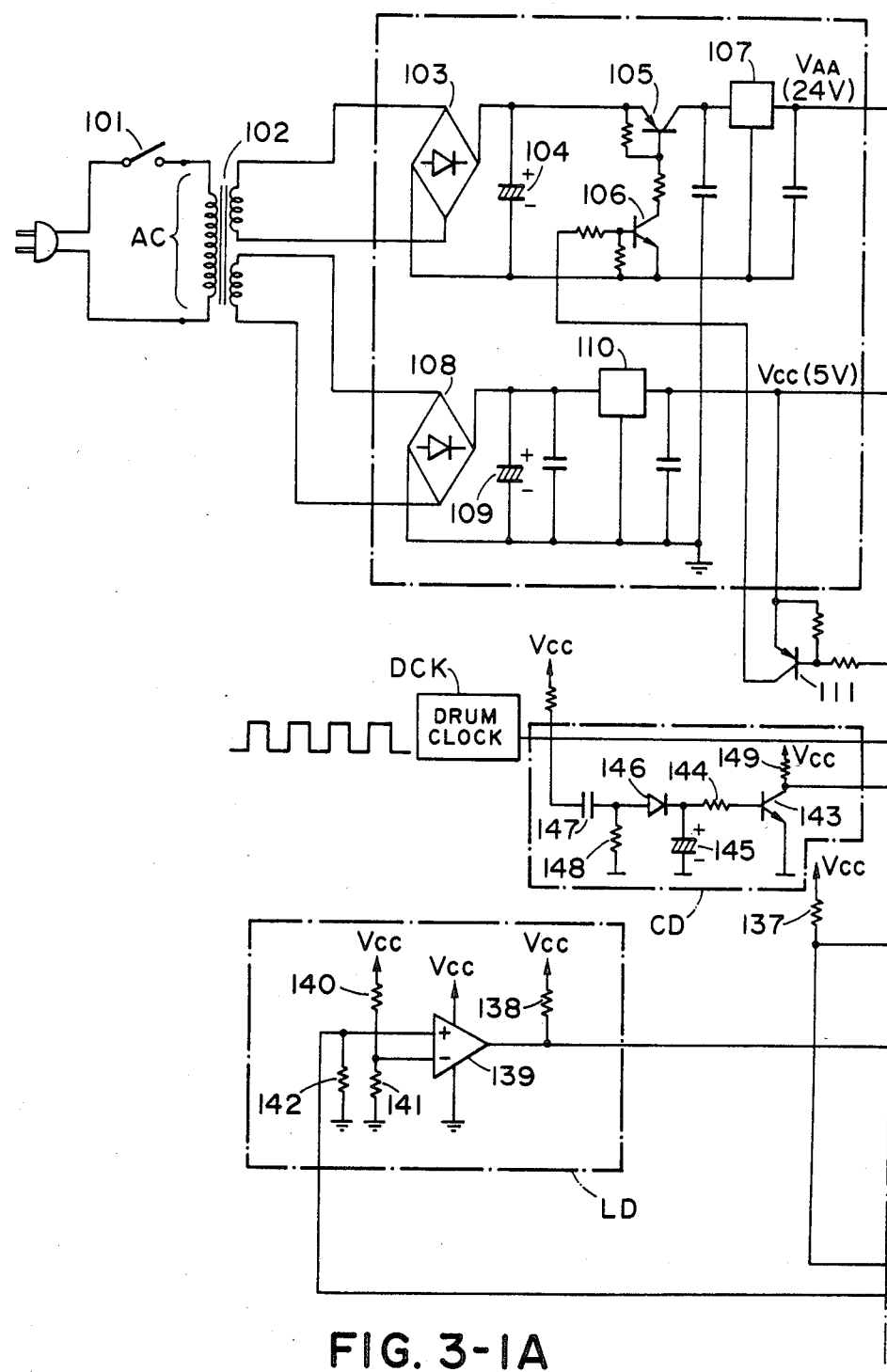
Figures 1B, 3:
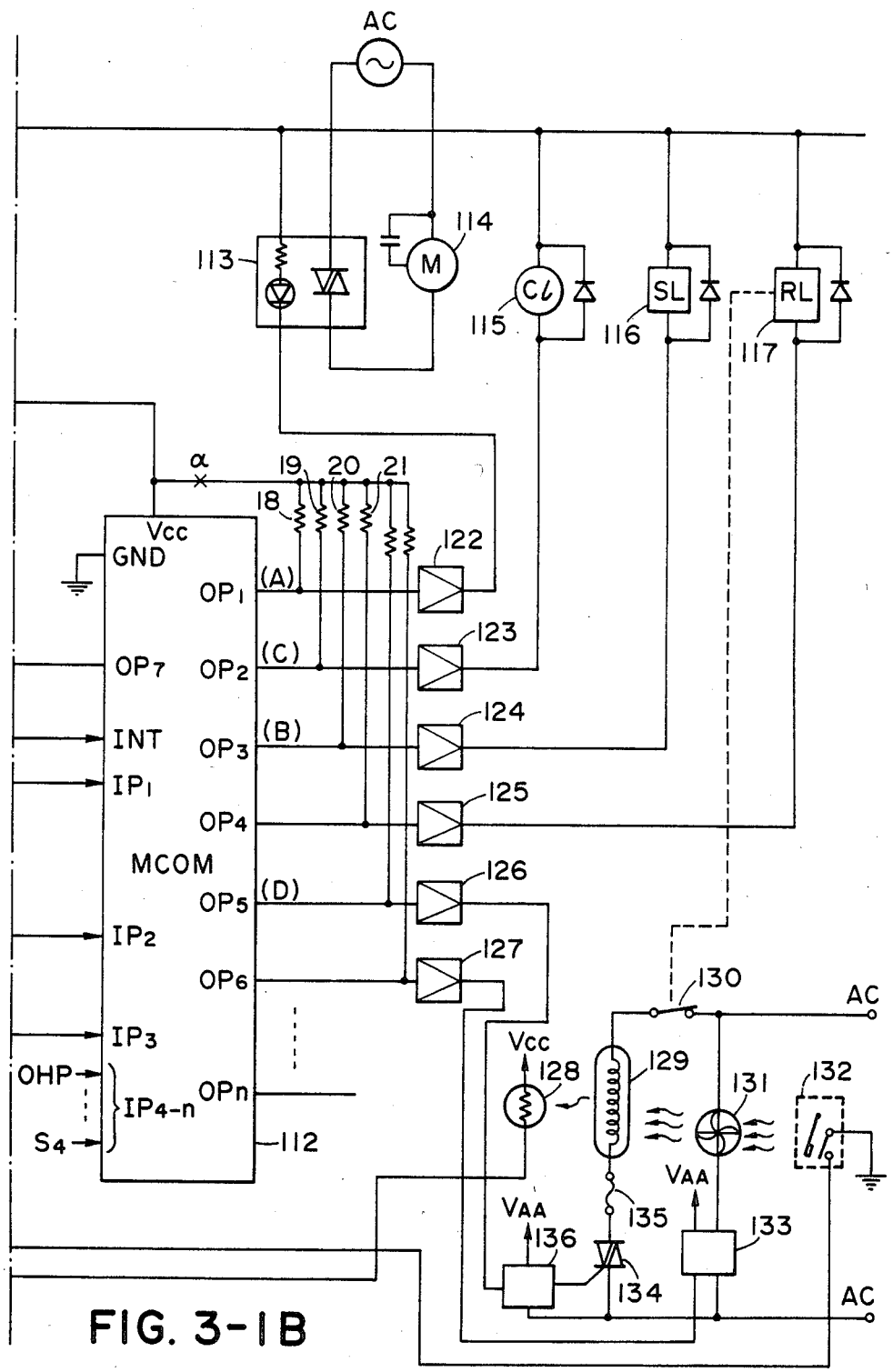
Figures 2, 3:
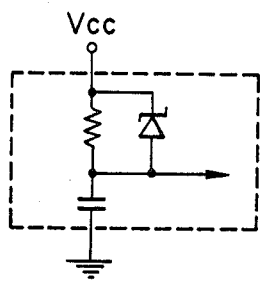

FIG. 3 shows an example of the control circuit for use in the apparatus shown in FIG. 2, wherein 101 is a manual main switch for supplying electric power to the control circuit, and 102 is a low-voltage transformer of which a secondary coil is connected to a power supply circuit composed of a bridge diode 103, a condenser 104, transistors 105, 106 and a regulator IC 107 for supplying a voltage $V_{AA}$ for driving clutches, plungers, lamps etc. of the copier, and of which the tertiary coil is connected to a power supply circuit composed of a bridge diode 108, a condenser 109 and a regulator IC 110 for supplying a voltage Vcc to a micro-computer 112 and drive amplifiers 122-127 to be explained later. The micro-computer 112 constitutes a controller composed of an already known one-chip micro-computer MCOM, for example TMS1000 supplied by Texas Instruments Co. or μCOM43 supplied by Nippon Electric Co., provided with a read-only memory for storing the control programs, a random-access memory for temporarily storing the control data, entered data such as copy set number and output data for sequence control and display, input/output ports composed of latch registers for receiving the key entry data and releasing control signals to various process means, and an arithmetic logic unit ALU for processing the input data from the input ports and releasing determined output signals from the output ports, all incorporated in a single semiconductor chip.

Figure 4:
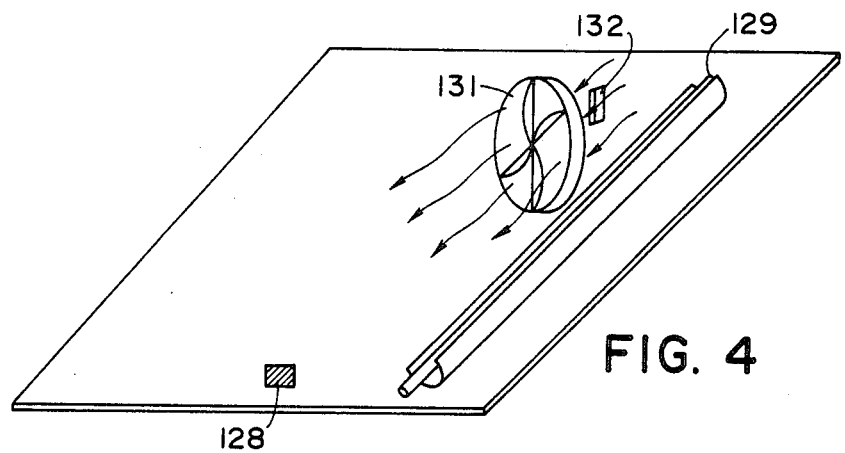
FIG. 4 is a schematic view showing the arrangement of the exposure station.

An output port OP1 (A) is connected through a driver circuit 122 to a known photocoupler solid-state relay 113 for driving a main motor 114 which in turn drives the drum 11, rollers 28, 29, 30, 33 and optical system 15-17. An output port OP2 (C) is connected through a driver circuit 123 to a clutch 115 for controlling the displacement of said optical system 15-17. An output port OP3 (B) is connected through a driver circuit 124 to a solenoid 116 for controlling the sheet feeding by the roller 28. An output port OP4 is connected to a safety relay 117 for controlling a contact 130. An output port OP5 (D) is connected through a driver circuit 126 to a regulator 136 for stabilizing the function of the exposure lamp. Thus, in response to an output signal from said output port OP5 while the relay 117 is energized, a triac 134 is turned on to light the exposure lamp 129, which light is thus detected by a CdS sensor 128. An output port OP5 is connected through a driver circuit 127 to a solid-state relay 133 for driving a cooling fan motor 131. An air pressure sensor 132 is composed of a reed switch, a magnet and an air pressure detecting plate arranged as shown in FIG. 4 for monitoring the function of the cooling fan, wherein the magnet attached to said detecting plate is positioned apart from or close to said reed switch to turn off or on the same, respectively when the cooling fan is running or is stopped. Said reed switch is grounded at a terminal thereof and is connected, at the other terminal, to an input port IP2 of the controller 112. An output port OP7 releases an output signal for turning on the drive power supply. In addition to the foregoing, there are provided other output ports for providing signals to other process means.

An input port INT, for interrupting the main program and executing an interruption program in response to an external signal, receives the drum clock pulses DCK, which number is counted by an internal counter. Said drum clock pulses DCK are also supplied to a clock detecting circuit CD composed of resistors 144, 148, 149, condensers 145, 147, a diode 146 and a transistor 143 and is rectified therein to turn on said transistor 143, which output signal is supplied to an input port IP1. An input port IP3 receives the output signal from the aforementioned CdS sensor 128 through a light detecting circuit LD composed of resistors 138, 140–142, and a comparator IC 139. Also, the signals OHP-S4 obtained from the detectors shown in FIG. 2 are supplied to other input ports.

Figure 6:
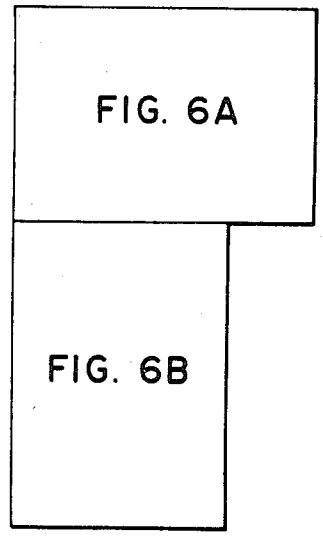
FIG. 6 illustrates a connecting relation between FIGS. 6A and 6B which show in their combination a control flow chart of the control circuit shown in FIGS. 3-1A, 3-1B and 3-2.
Figure 5A:
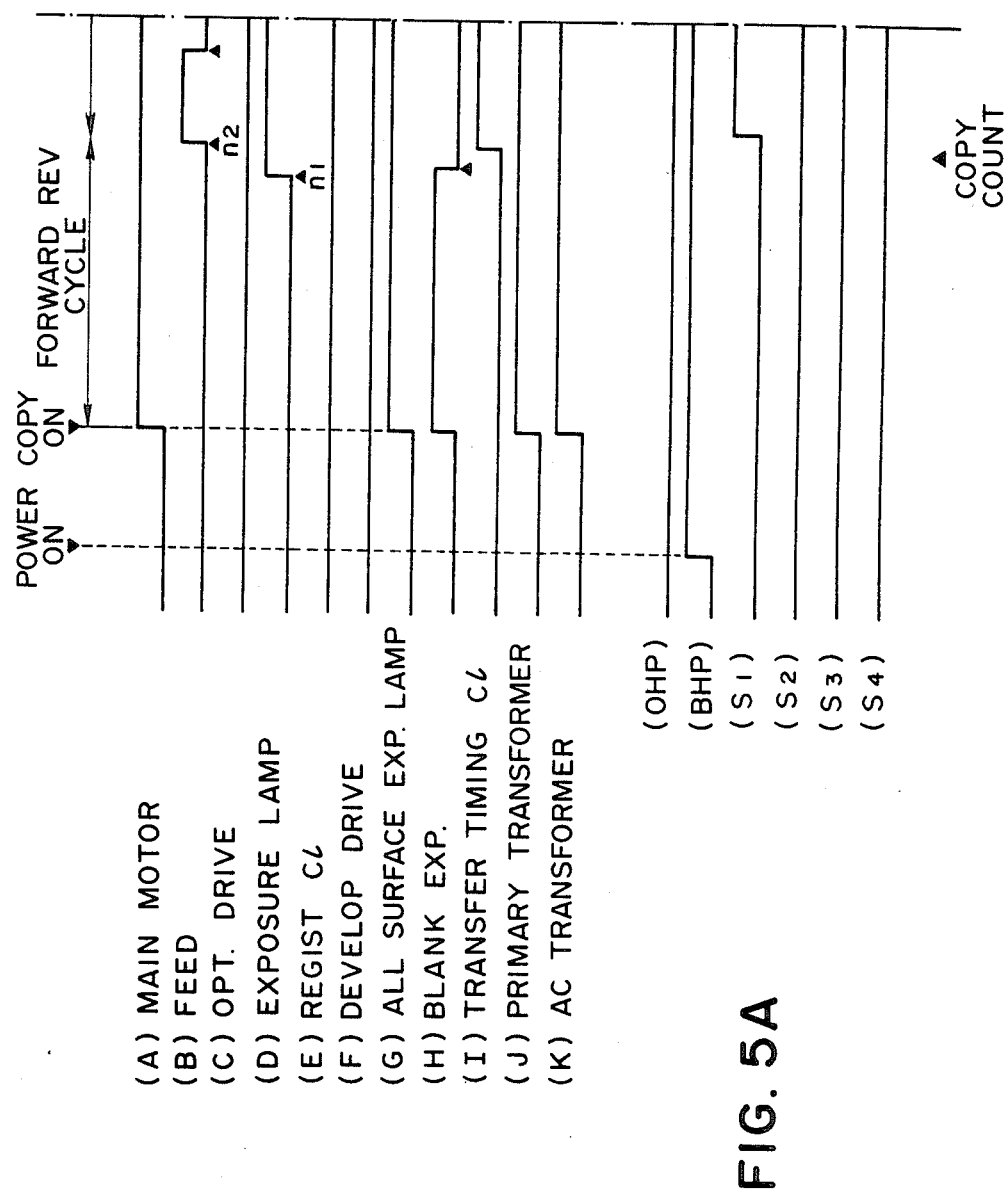
Figure 5B:
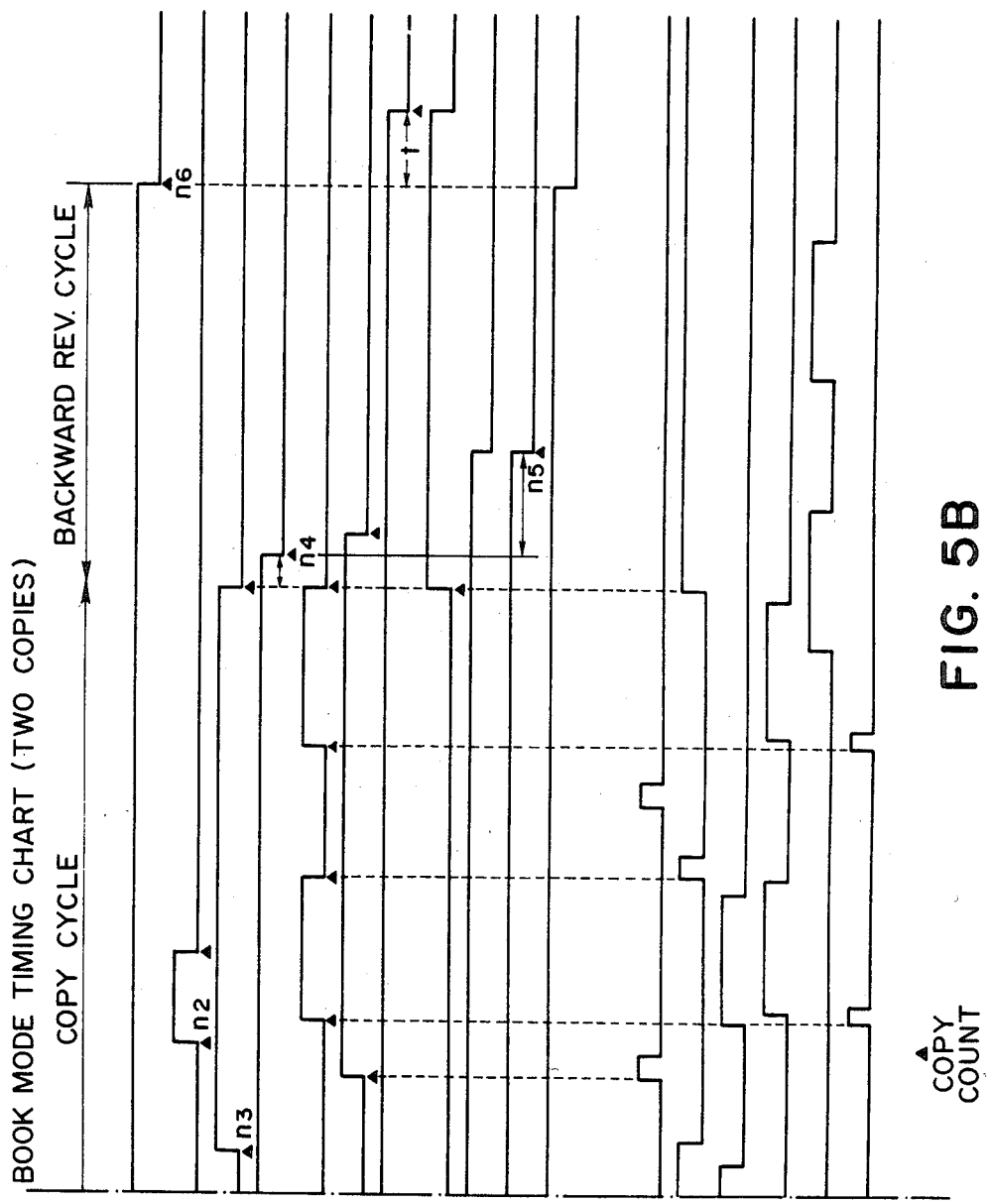
Figure 6B:
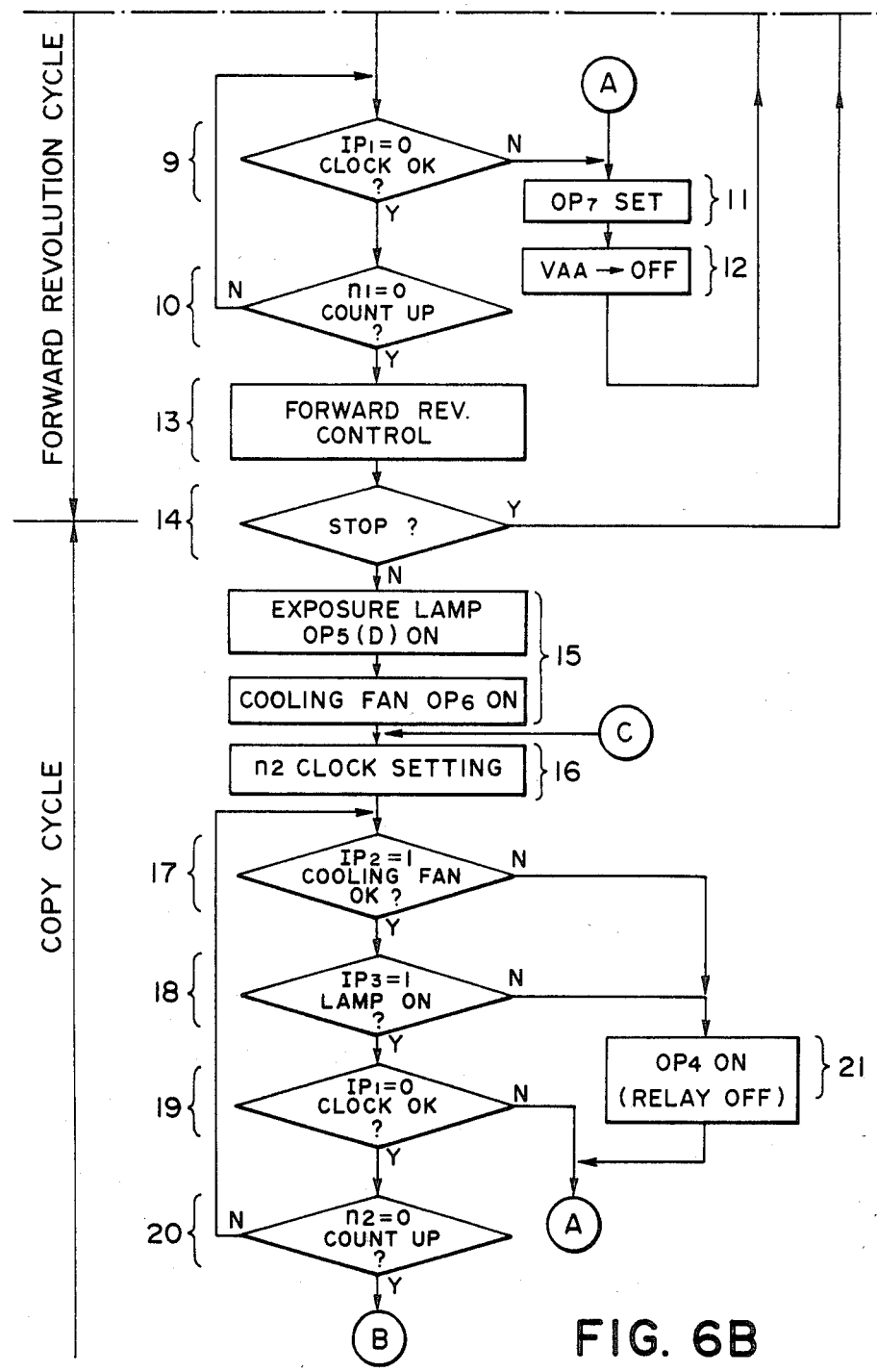

FIG. 5 shows a timing chart for a book-mode copying on the present copier (sheet-mode indicating the use of the attachment 100) for two copies, and FIG. 6 shows the corresponding control flow, which is coded and stored in a masked read-only memory in the controller 112.

Now the function of the above-explained apparatus will be explained in the following description, while making reference to FIGS. 5 and 6.

It is to be noted, in the apparatus shown in FIG. 2, that the optical system 15–17 is maintained at the right-hand end position before and after the copying operation, whereby the sensor 38 is activated in these states.

Copy Preparation Cycle

Upon turning on the main switch 1, the low-voltage transformer 102 supplies power to the power supply circuits. The drive power supply circuit 103–107 does not however release the voltage $V_{AA}$ as the transistors 105, 106, are turned off. On the other hand the control power supply circuit 108–110 is immediately activated to supply the voltage Vcc to the controller 112, which thus initiates the execution of the control flow shown in FIG. 6, clearing the data memory in the Step 1 and resetting the output ports OP1–OP6 in the Step 2.

In the succeeding Steps 3 and 4, the output port OP7 is reset to "0" level to turn on the transistor 111, whereby the transistor 106 and then the transistor 105 are turned on to activate the regulator IC 107, thus releasing the voltage $V_{AA}$ to the process means of the apparatus. In this manner the supply of the voltage $V_{AA}$ to the process means is initiated after the output ports OP1–OP6 for driving said process means are reset, so that the erroneous function of the clutches, plungers, etc. at the power-on of the apparatus is securely prevented. Step 5 executes preparatory functions for copying, such as key entry and display of the copy set number. Step 6 identifies whether the copy key is actuated.

Pre-Rotation Cycle

In response to the actuation of the copy key, the output port OP1 (A) is shifted to the level "1" in the Step 7 to activate the driver circuit 122, whereby the relay 113 is energized to switch on the main motor 114, thus initiating the drum rotation. Also as shown in the timing chart shown in FIG. 5, other process means such as the whole surface exposure lamp, primary charging transformer and AC charging transformer are activated, thus starting the copying cycle. The Step 8 sets a clock pulse number n1 in the random-access memory of the controller 112 for executing a pre-rotation cycle for effecting drum cleaning and causing preliminary fatigue thereon. The Step 9 monitors the normal entry of the drum clock pulses DCK to the controller 112. Upon entry of a drum clock pulse into the clock pulse detecting circuit, the transistor 143 is turned on to shift the collector and the input port IP1 to the level "0", but, in the absence of the drum clock pulse said transistor 143 is turned off to maintain the collector thereof and the input port IP1 at the level "1". Thus the program proceeds to the Step 10 in the normal state represented by the "0"-level state of the input port IP1, or to the Step 11 in the abnormal state represented by the "1"-level state of said port. The Step 10 identifies if the drum clock pulses are counted to the number n1, and, upon completion of the counting, the program proceeds to the Step 13, at which the program proceeds from the pre-rotation cycle to the copy cycle as shown in FIG. 5. Also in case of an abnormality in the drum clock pulses, the Steps 11 and 12 set the output port OP7 to the level "1" to turn off the transistor 111, whereby the transistors 106, 105 are turned off to cut off the power supply to the regulator IC 107, thus terminating the supply of the voltage $V_{AA}$ and deactivating the process means. However the control power supply circuit continues to be operative, thus continuously enabling displays and key entires.

Copy Cycle

Upon completion of the pre-rotation control, the program identifies, in the Step 14, whether the stop key is actuated, and proceeds to the Step 26 to be explained later if said key is actuated. If it is not actuated, the program proceeds to the Step 15 to set the output port OP5 (D), whereby the exposure lamp regulator 136 and thus the triac 134 are turned on to light the exposure lamp 129. Also the output port OP6 is set to energize the relay 133, thus activating the cooling fan 131. The lighting of said exposure lamp 129 is monitored by the CdS sensor 128, which output signal is supplied to the non-inverted input terminal of the comparator 139 for comparison with a determined voltage supplied to the inverted input terminal thereof. The output signal from said comparator 139 is supplied to the input port IP3 for monitoring the exposure lamp 129 by the controller 112. Also the function of the cooling fan 131 is monitored by the sensor 132, which output signal is supplied to the input port IP2.

The Step 16 sets a clock pulse number n2 for executing the copy cycle, and the Step 17 identifies whether the input port IP2 is at the level "1", indicating normal function of the cooling fan. Successively, the Step 18 identifies whether the input port IP3 is at the level "1", indicating the lighted state of the exposure lamp. Then the Step 19 identifies whether the input port IP1 is at the level "0", indicating the normal state of the drum clock pulses DCK. In case a malfunction of the fan or the exposure lamp is detected in the Step 17 or 18, the program proceeds to the Step 21 to shift the output port OP4 to the level "1", thus activating a driver 125 to energize the safety relay 117. The contact 130 thereof is thus opened to terminate the power supply to said lamp 129. Subsequently the program proceeds to the Step 11 to turn off the drive power supply circuit in a manner as explained in the foregoing. Also in case an abnormality in the clock pulses is found in Step 19, the program proceeds to the Step 11 without effecting control on the relay 117. In this case an additional safety can be secured if the program is designed to jump to the Step 11 after executing the Step 21.

Upon counting of n2 pulses in the Step 20, the program proceeds to the Step 23 to activate the paper feed roller by the output signal (B) and to execute the copy cycle control on various process means as shown in FIG. 5. The succeeding Step 24 identifies whether the stop key has been actuated, and, if actuated, the program proceeds to the Step 26. Also the Step 25 identifies whether the number of completed copies has reached the initially set copy number, and, if not, the program returns to the Step 16. In this manner the cooling fan, exposure lamp and drum clock pulses are checked in the Steps 17 to 19 in every copying cycle.

Post-Rotation Cycle

Upon completion of the copy cycles of the set number, the program proceeds to the Step 26 to execute the post-rotation cycle control as shown in FIG. 5, to terminate the copying operation, then to shift to the copy preparation cycle prior to the Step 5 and to await the next copying instruction. The period of said post-rotation cycle is determined by the counting of a determined number n6 of drum clock pulses DCK, and the main motor is stopped upon completion of said counting. Also said counting is initiated when the sensor S3 detects the ejection of the transfer sheet, or when the primary transformer is turned off. The aforementioned checking Step 19 is executed also during said counting.

The exposure lamp is turned off upon counting of a determined number n3 of the drum clock pulses after the return of the optical system to the original position, and the primary transformer is turned off upon counting of a determined number n5 of the clock pulses after said counting of n3 pulses. The check routine of the Steps 17–19 is executed even during said counting operations.

The function of the cooling fan can also be monitored by a temperature-detecting element such as a thermister in place of the air-pressure detector utilizing reed switch explained in the foregoing.

As explained in the foregoing, the present invention is capable of preventing the erroneous function of the process means at the turning on of the power supply since the drives therefore are powered only after the control means such as the micro-computer is reset at said turning on of the power supply.

In the foregoing embodiment wherein the power supply circuit is controlled through the output port OP7 of the micro-computer 112 as shown in FIG. 3-1, it is also possible, as another embodiment, to turn on the power supply circuit by connecting a reset timer circuit to be activated upon turning on of the main switch 101 to the transistor 111, thereby turning on said transistor 111 only after the lapse of time determined by said timer circuit. Also in case the micro-computer is provided with a reset port, said reset timer circuit is connected to said port, whereby the micro-computer is initialized to execute the program shown in FIG. 6 upon receipt of a reset pulse generated by the function of said timer circuit. In such case said reset timer circuit releases a time-up signal to turn on the transistor 111 after the completion of the Step 2. Also a reset timer circuit composed of a Zenar diode Z and a condenser C as shown in FIG. 3-2 prevents the erroneous function of the micro-computer at the leading and trailing end of the supply of the voltage Vcc.

In contrast to the foregoing embodiment in which the process power supply circuit is reset by the output signal from the port OP7 shown in FIG. 3-1, it is also possible to provide a circuit to be turned on or off by said output signal from the port OP7 at a position a, in order to delay the voltages supplied to the drive amplifiers 122–127 through the resistors 18–21.

The foregoing embodiment, adapted to turn off the power supply to the process means in response to an abnormality in the clock pulses while maintaining the power supply to the micro-computer for process control, ensures a safe operation and facilitates the re-start of the copying operation since the content of the random access memory is retained.

An additional safety feature is offered by interrupting the power supply line at the point a between the micro-computer and the driver for process means, simultaneously with the interruption of the power supply in response to a detected abnormality in the clock pulses, or in response to a detected abnormal temperature.

In addition to the case of an abnormality in the clock pulses, a similar procedure can be executed to ensure the safety of the apparatus in case of an abnormality in the pulse OHP indicating the home position of the optical system, pulse BHP indicating the backward position of the optical system or pulse S4 indicating the registering position, i.e. in case these pulses are not obtained within determined periods from the start of the optical system.

Futhermore the foregoing embodiment ensures increased reliability since the function of the temperature control means such as the blower or fan is constantly monitored, and, in an abnormal case, a measure is taken in a similar manner as in the case of abnormal pulses.

Furthermore, in case of an abnormality in the foregoing embodiment, it is possible to cut off the power supply to the exposure lamp, motor etc. and to maintain the power supply to the display units for copy number and alarm displays, thereby continuing the display of numbers during the interruption of copier function and giving an alarm indication for calling a serviceman through the micro-computer 112 shown in FIG. 3-1.

Now FIGS. 7, 13, 14 and 18 show embodiments utilizing plural micro-computers in the apparatus shown in FIG. 2-1 for shared control of the process means and the keys and displays shown in FIG. 2-2.

Figure 7:
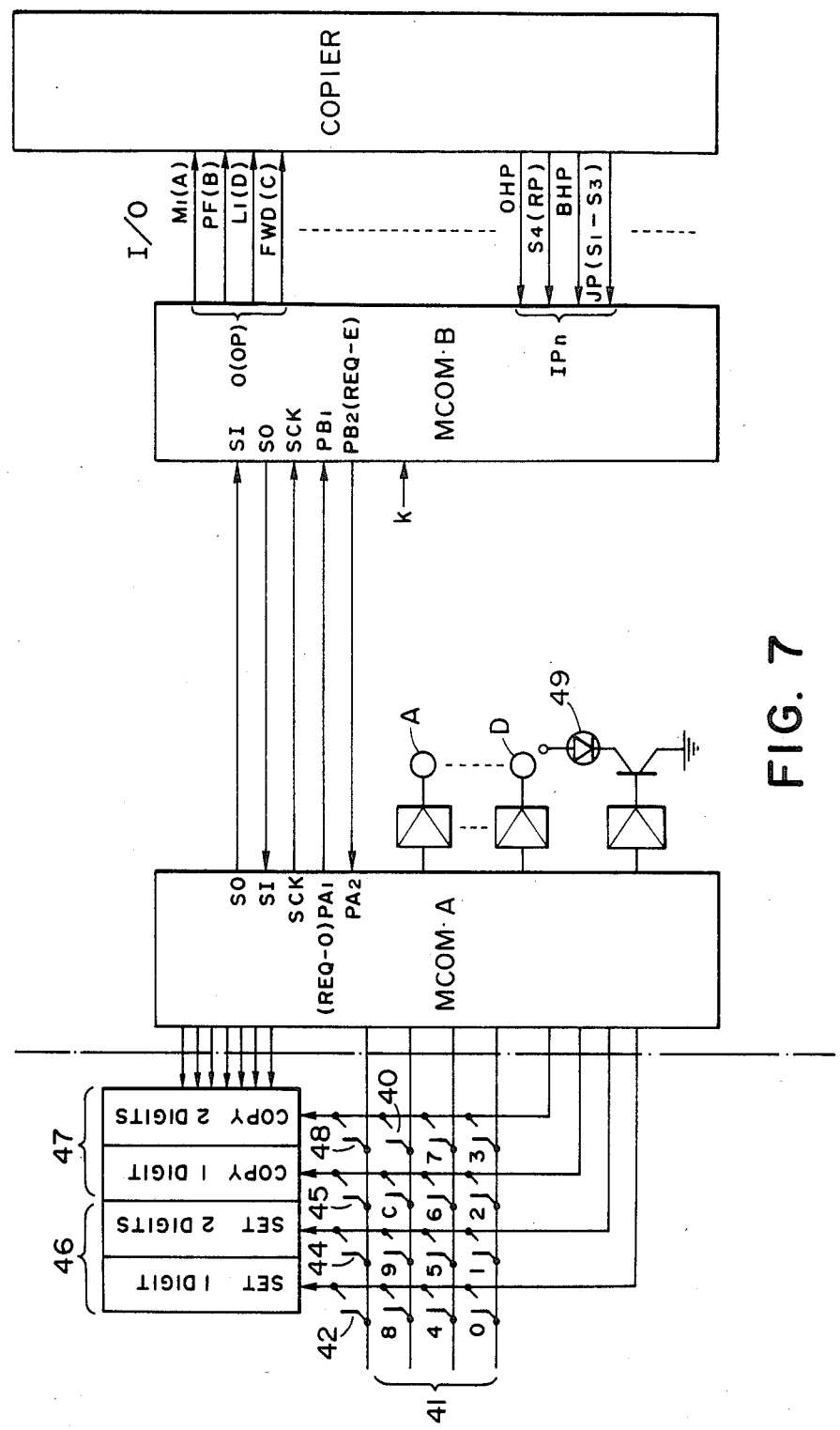
FIG. 7 is a diagram showing another control circuit according to the present invention.

The control circuit shown FIG. 7 is provided with two micro-computers MCOM.A and MCOM.B, of which the latter corresponds approximately to the micro-computer 112 shown in FIG. 3-1.

The micro-computer MCOM.A is adapted to store the desired copy number entered by keys 41 into a memory, to drive a display unit 46 for indicating said copy number for the operator, and to drive a display unit 47 for indicating the remaining number of copies during repeated copy cycles. Also said micro-computer MCOM.A is adapted to release a copy start signal in response to the actuation of a key 40, a stop signal in response to the actuation of a key 42, a cassette select signal, a cassette selection display signal for indicating the upper or lower cassette and a cassette size display signal in response to the actuation of cassette select keys 44, 45, and, for these purposes, it is provided with a read-only memory with instruction code programs.

The micro-computer MCOM.B is adapted to release sequence control signals for the process means for executing the aforementioned steps of charging, exposure etc. constituting the copying process, and, for this purpose, it is provided with a read-only memory with instruction code programs. More specifically said micro-computer MCOM.B releases output drive signals A–K thorugh the output ports thereof to the main motor, paper feed solenoid, exposure lamp, optical system etc., and receives through input ports the optical system home position signal OHP, the backward position signal BHP and other input signals from various sensors.

The micro-computer MCOM.A is provided with a random access memory for storing the copy set number, copy number etc. required for display, and the micro-computer MCOM.B is provided likewise with a random access memory for temporarily storing the timing data etc. required for sequence control.

In addition each micro-computer is provided with a shift register function, which is fully utilized in the copier control of the present embodiment, whereby the control of a multi-function copier having multiple process loads, multiple displays, multiple input sensors and multiple input keys, particularly the control with plural micro-computers, can be quite easily achieved. The micro-computer as mentioned above can be exemplified by µCOM43N supplied by Nippon Electric Co.

In the present embodiment the data transfer between the micro-computers MCOM.A and MCOM.B is achieved serially through said shift register function.

The micro-computer MCOM.A or MCOM.B is provided with an output port SO for serial data signals, an input port SI for serial data signals, and an input/output port SCK for shift clock pulses. The ports SO and SI of MCOM.A are respectively connected to the ports SI and SO of MCOM.B, and the ports SCK of said micro-computers are mutually connected. A port PA1 of MCOM.A for releasing a signal REQ-O, for indicating in advance the data transfer from MCOM.A to MCOM.B, is connected to an input port PB1 of MCOM.B. An output port PB2 of MCOM.B, for releasing a signal REQ-E, indicating the stand-by state for data reception by MCOM.B, is connected to an input port PA2 of MCOM.A.

Thus, when the micro-computer MCOM.A detects the actuation, of for example, the copy start key 40, said micro-computer MCOM.A transfers the data for start instruction to MCOM.B for activating process loads connected thereto. For this purpose the start instruction data are set in the shift register of MCOM.A for output from the port SO, and said signal REQ-O advising the data transfer is supplied from the port PA1 of MCOM.A to the input port PB1 of MCOM.B. In response to said signal the micro-computer MCOM.B sets the data, indicating the current state of the copier, such as interrupted copy cycle state or stand-by state, in the shift register of MCOM.B for output from the output port SO, and releases the enable signal REQ-E from the port PB2 to MCOM.A. In response to said signal MCOM.A inititates the data transfer from the port SO of MCOM.A to the port SI of MCOM.B, and, upon completion of said transfer, the data thus transferred are processed by interruption programs in MCOM.A and MCOM.B.

Figure 8:
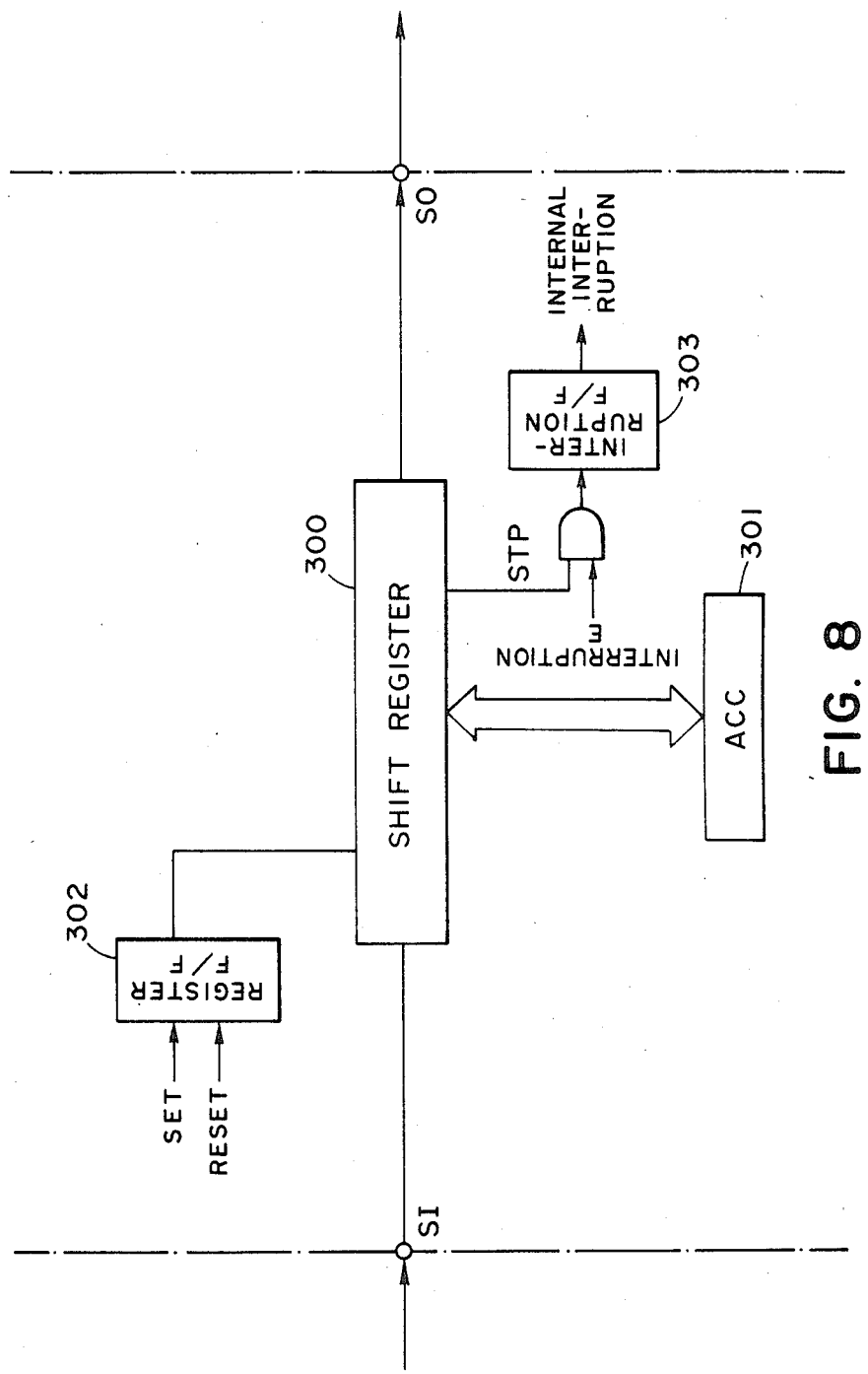
FIGS. 8 and 9 are circuit diagrams showing the details of the circuit shown in FIG. 7.

FIG. 8 shows the circuit diagram of the shift register provided in the micro-computer MCOM.A or MCOM.B, in which a shift register 300 is controlled by a register flip-flop 302, and the signal for internal program interruption is generated by an interruption flip-flop 303. Said interruption flip-flop 303 is set by an interruption signal E or a signal STP to be generated when the function of the shift register is stopped. Said shift register is further connected through an internal bus line to an accumulator (ACC) 301 in the micro-computer for data transfer to or from said accumulator.

Figure 9:
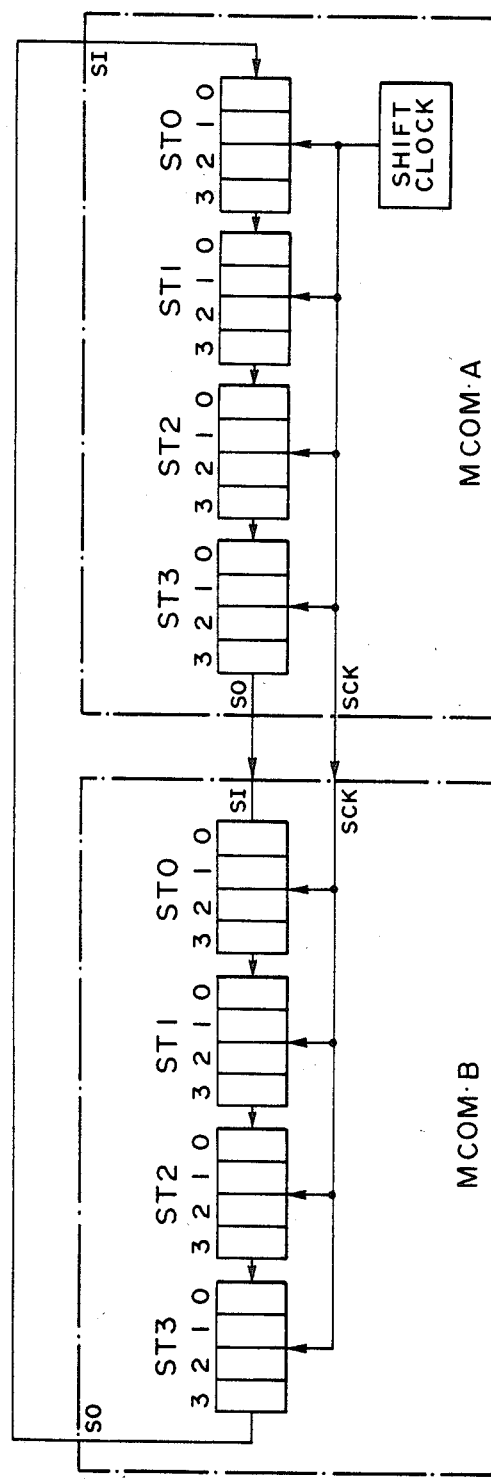

FIG. 9 shows the details of serial data transfer between the serial shift registers connected between MCOM.A and MCOM.B. In the illustrated example each shift register is supposed to be of 16 bits, composed of unit shift registers ST0–ST3 of 4 bits. Said shift registers perform shifting functions in synchronization with shift clock pulses SCK which are generated in MCOM.A in the present example.

Figure 10:
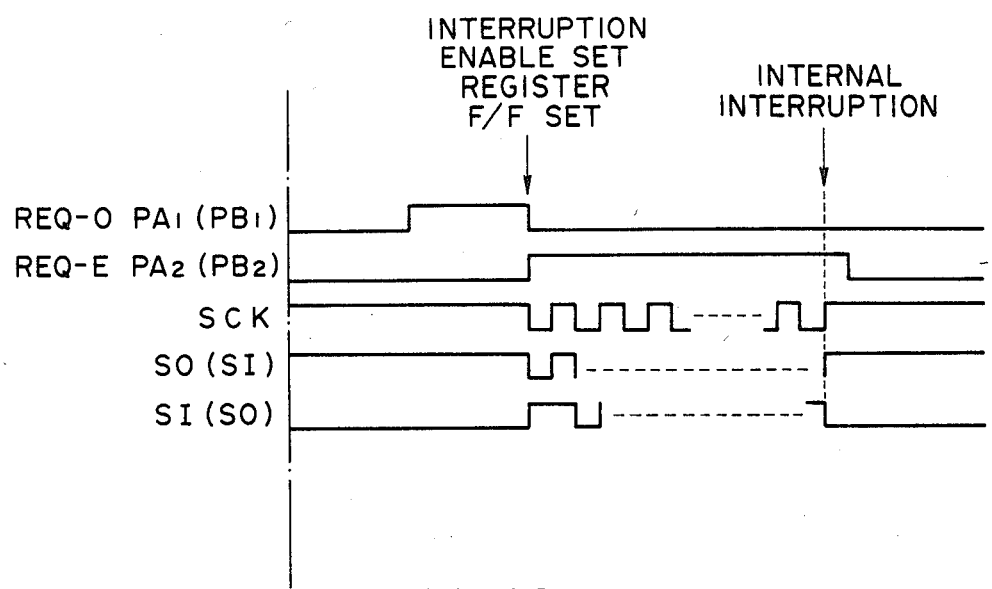
FIG. 10 is a timing chart showing the output signals of the circuit shown in FIG. 7.

FIG. 10 shows the timings of serial data transfer. As explained in the foregoing, MCOM.A and MCOM.B set the data to be transferred in the shift registers respectively corresponding to the signals REQ-O and REQ-E, and MCOM.A generates the shift clock pulses SCK in response to the interruption enable signal E shown in FIG. 8 and to the setting of the register flip-flop 302 to mutually exchange the data stored in the shift registers in synchronization with said clock pulses. Upon termination of said clock pulses the internal program interruption signals are exchanged between MCOM.A and MCOM.B whereby the data thus transferred are judged by the respective internal program interruption routines.

Figure 11:
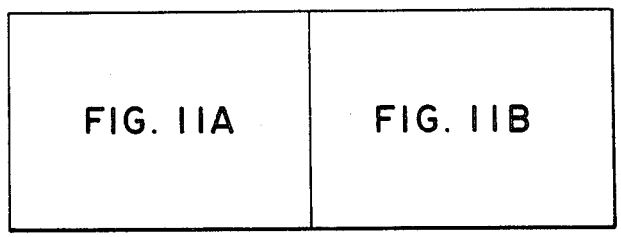
FIG. 11 illustrates a connecting relationship between FIGS. 11A and 11B.
Figure 12:
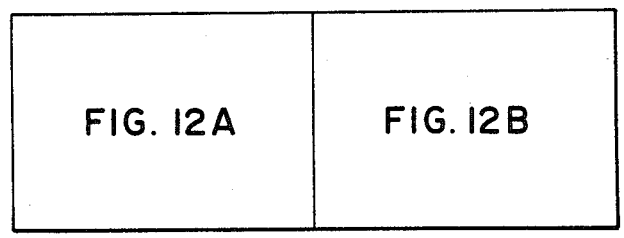
FIG. 12 illustrates a connecting relationship between FIGS. 12A and 12B.
Figure 11A:
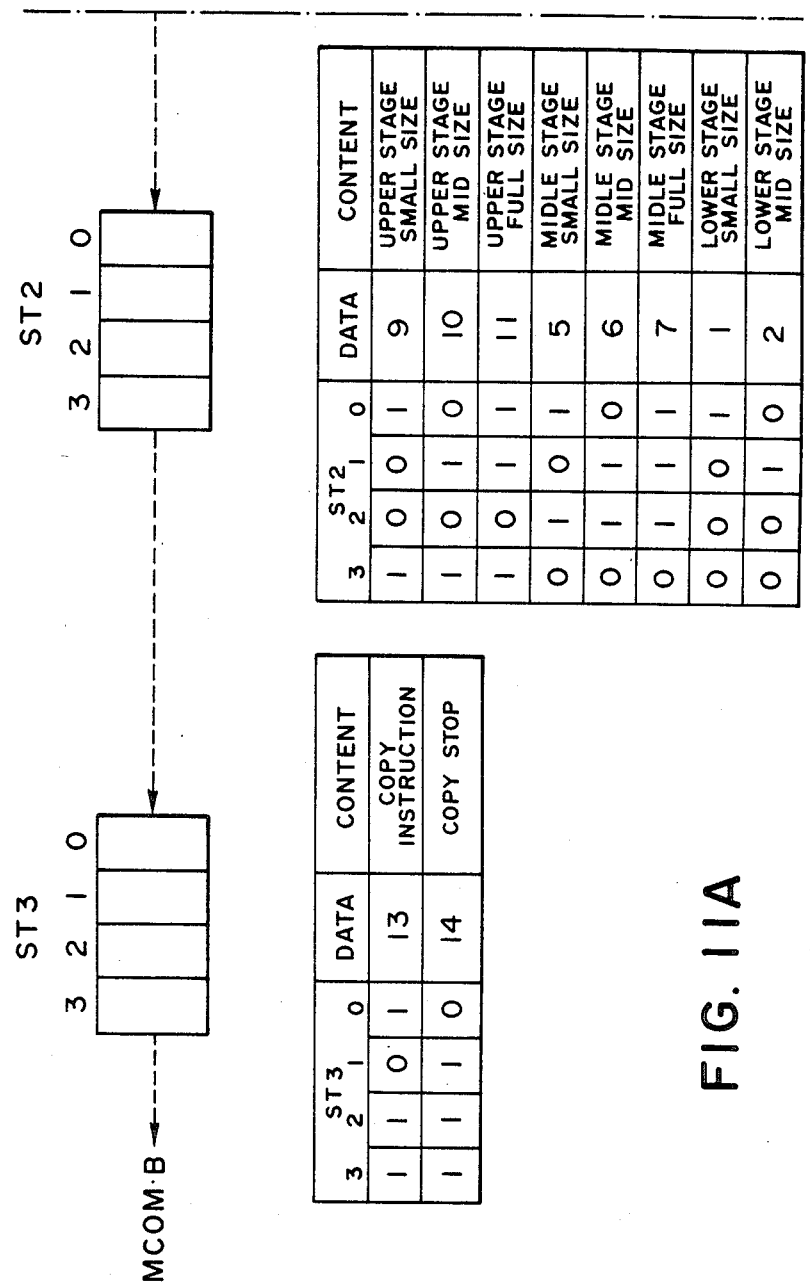
FIGS. 11A, 11B, 12A and 12B show in their combination charts showing the data in the circuit shown in FIG. 7.
Figure 11B:
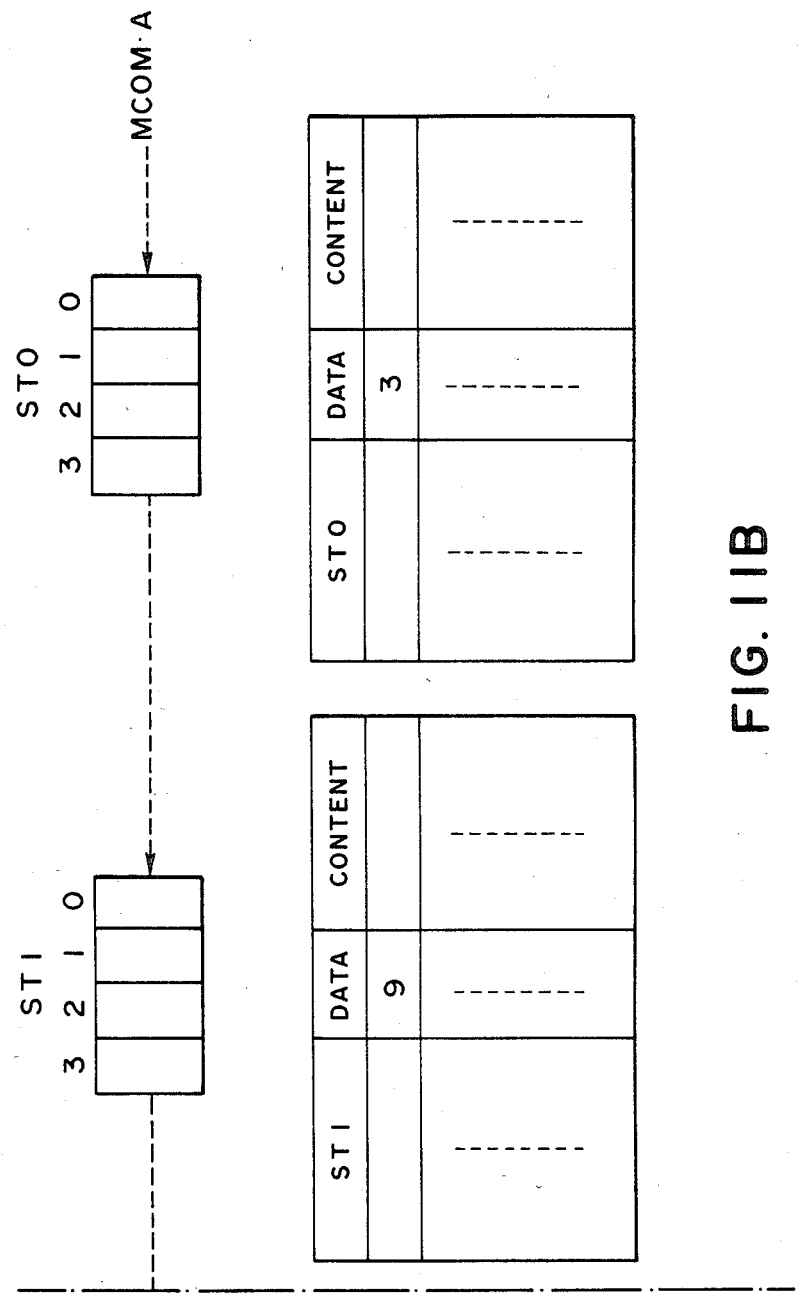
Figure 12A:
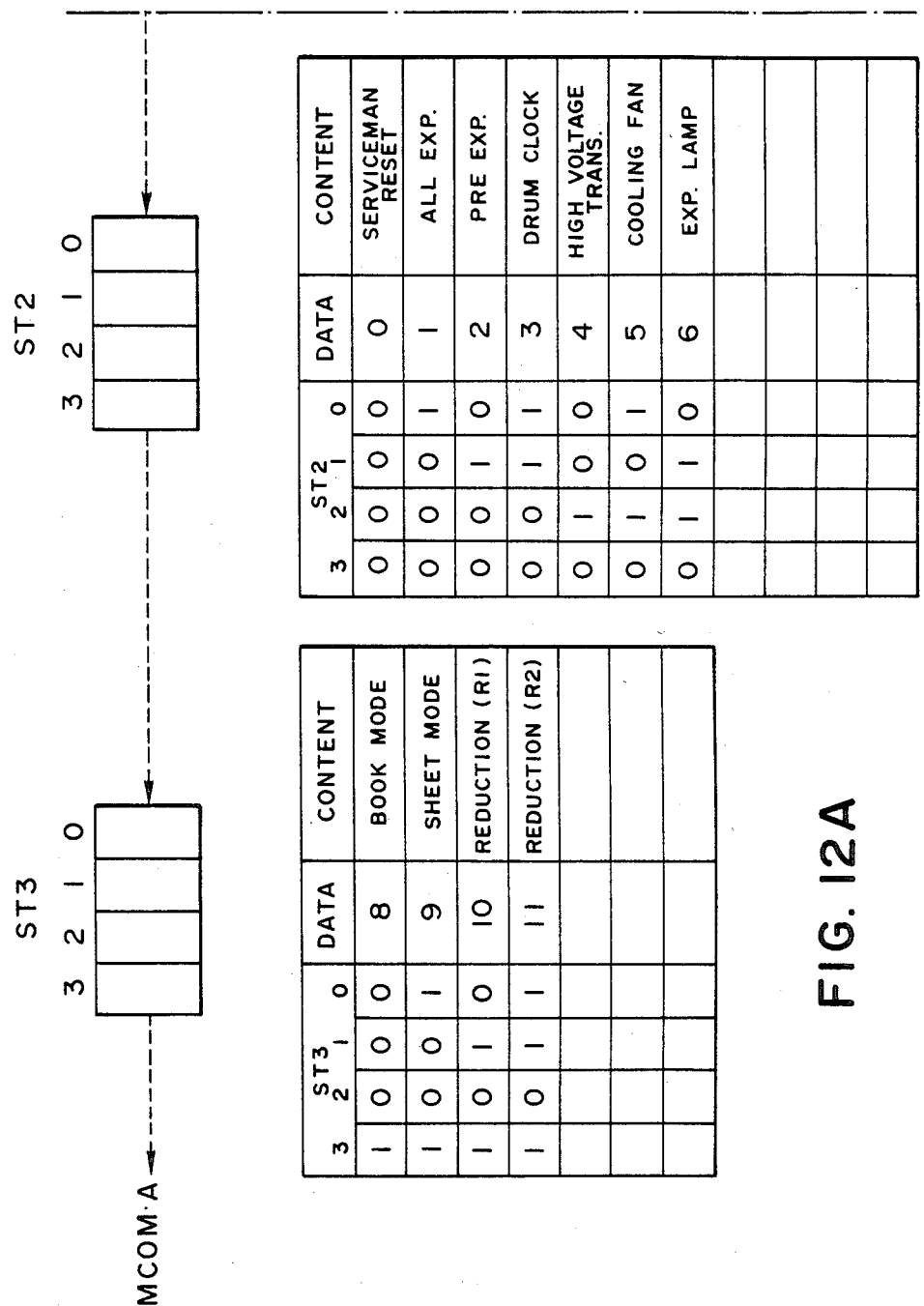
Figure 12B:
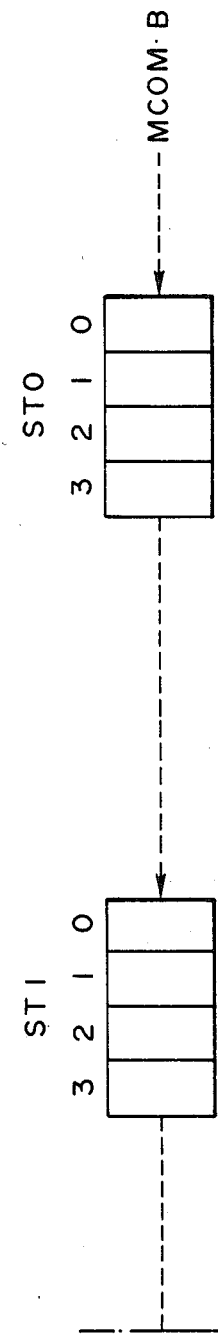

FIG. 11 shows various data to be transferred from MCOM.A to MCOM.B, whereas FIG. 12 shows the data to be transferred from MCOM.B to MCOM.A.

In FIG. 11, the shift register ST2 of MCOM.A stores the data for cassette position and cassette size; "9" for a small-sized cassette at upper stage; "11" for a large-sized cassette at upper stage; "1" for a small-sized cassette at lower stage; and "12" for a medium-sized cassette at a lower stage. The data "5"–"7" for medium stage is not used in the case of the copier shown in FIG. 2 since it contains the upper and lower stages only. Also in the shift register ST3, the copy start instruction data and the copy stop data are respectively represented by "13" and "14".

In FIG. 12, the shift register of MCOM.B stores the data indicating the reproduction control mode in ST3, the timing mode in ST2, jamming mode in ST1, and the sequence mode in ST0. In the register ST0, "0" stands for the standby mode in which the drum is stopped after the completion of the preceding copy cycle and in which a new data entry by the keys 41 is enabled; "8" for the duration of repeated copy cycles from the actuation of the copy start key to the final image transfer step; "10" for the post-rotation mode for drum cleaning and drum potential leveling from the completion of said final image transfer step to the termination or drum rotation; "11" for a mode in which the drum rotation is stopped by sheet jamming and in which the keys 41 are disabled, for a duration from the jam detection to the enabling of copy start key actuation; "9" for the timing of advancing the copy counter in MCOM.A at which the reversing displacement of the optical system is started; and "12" for a waiting mode after the start of power supply during which the copy start key is disabled.

Also the register ST1 stores "1" in case a sensor 390 provided in the sheet path does not detect the transfer sheet within a determined time after the start of sheet feeding; "2" in case said sensor 390 senses an inclined position of the sheet; "3" in case the sheet stays on said sensor 390 in excess of a determined time or does not reach a sensor 391 within a determined time after passing said sensor 390; "4" in case a sensor 39 at the exit does not detect the sheet within a determined time after detection by said sensor 390; "5" in case the sheet stays on said sensor 39 in excess of a determined time; or "15" in case of a free run of the apparatus without sheet movement, during which the above-mentioned jam detection programs are disabled. Such jam detection disabled mode is obtained by grounding, by a switch, an input port k (FIG. 7) of MCOM.B prior to the start of copy cycle.

In place of the foregoing, it is also possible to use data "13", "14" and "15" for respectively disabling the jam detection functions of the sensors 39, 390 and 391. Furthermore "12" may be used for indicating a wait disabled mode in which the copy start key is enabled even during the waiting time.

Also the timing mode data area ST2 stores "0" upon detection by MCOM.B of the aforementioned abnormality in clock pulses or in temperature to cause MCOM.A to disable the data entry by the keys 41 and to display an error on the display unit E shown in FIG. 2-2; "1", "2" and "6" in response to output signals from MCOM.B for lighting the whole surface exposure lamp 24, pre-exposure lamp 220 and image exposure lamp 16 respectively, "3" in response to a pulse entry from the drum clock generator 116 to MCOM.B "4" in response to an output signal for activating the transformer for driving the corona chargers 22, 23 and 31; and "5" in response to an output signal for turning on the fan 131. Upon receipt of the above-mentioned data, MCOM.A can judge the function of various process means at appropriate timings.

The copy mode data area ST3 stores "8" for the book mode copying without the document drum attachment 100 shown in FIG. 2; "9" for copying with said attachment 100 mounted on the copier, in response to which MCOM.A firmly locks the optical system; "10" or "11" for reduction copy modes with a reduction rate of 80% or 70% respectively.

In a more complex system there is required an automatic document feeder for automatically feeding and setting originals to the original carriage 14 of the copier shown in FIG. 2-1 and ejecting the same after copying cycles, and a sorter for collating the copy sheets ejected to the tray 34.

Figure 13:
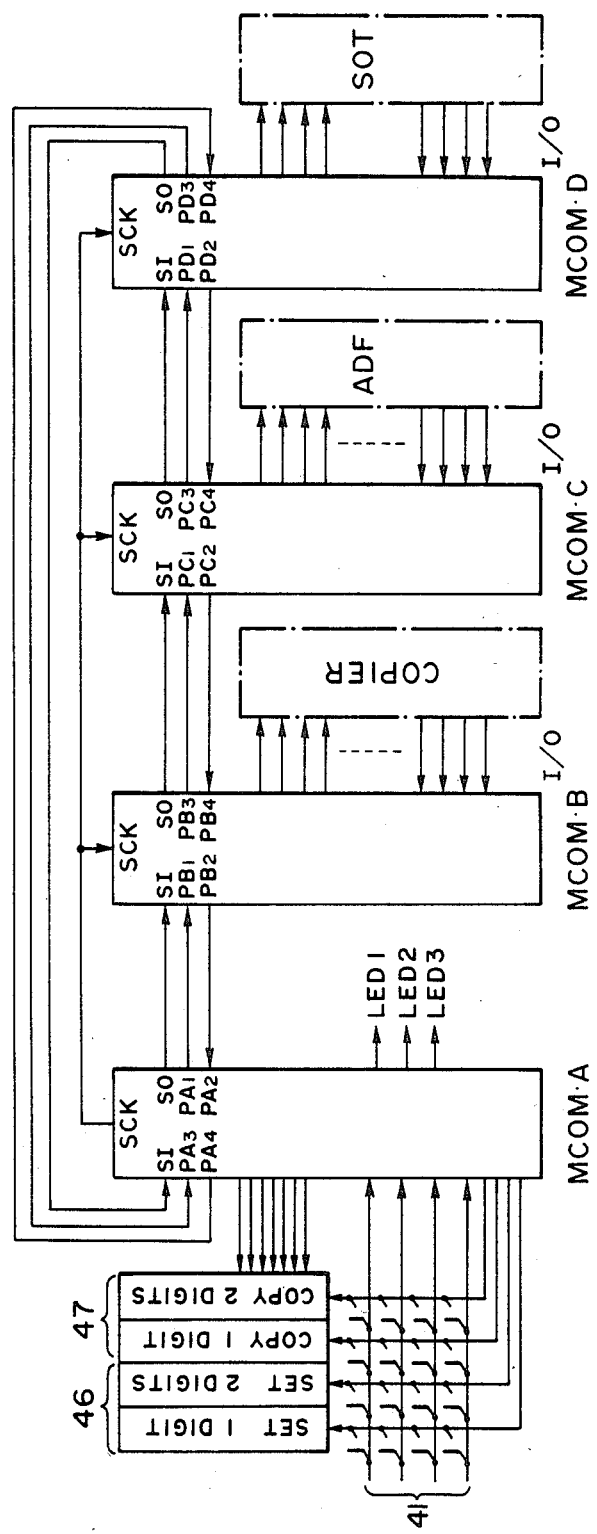
FIGS. 13 and 14 are diagrams showing other embodiments of the control circuit.
Figures 14, 15, 15C:
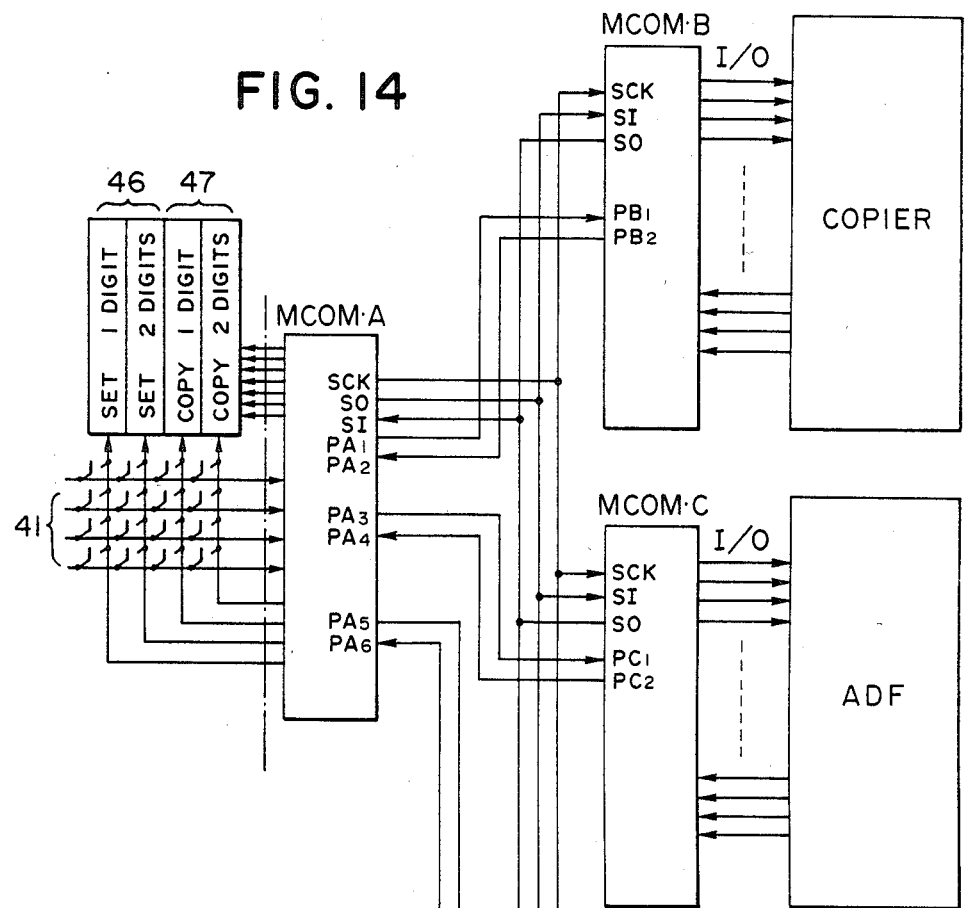
FIG. 15 illustrates a connecting relation between FIGS. 15A, 15B and 15C which show in their combination control flow chart of the control circuit shown in FIG. 7.
Figure 15B:
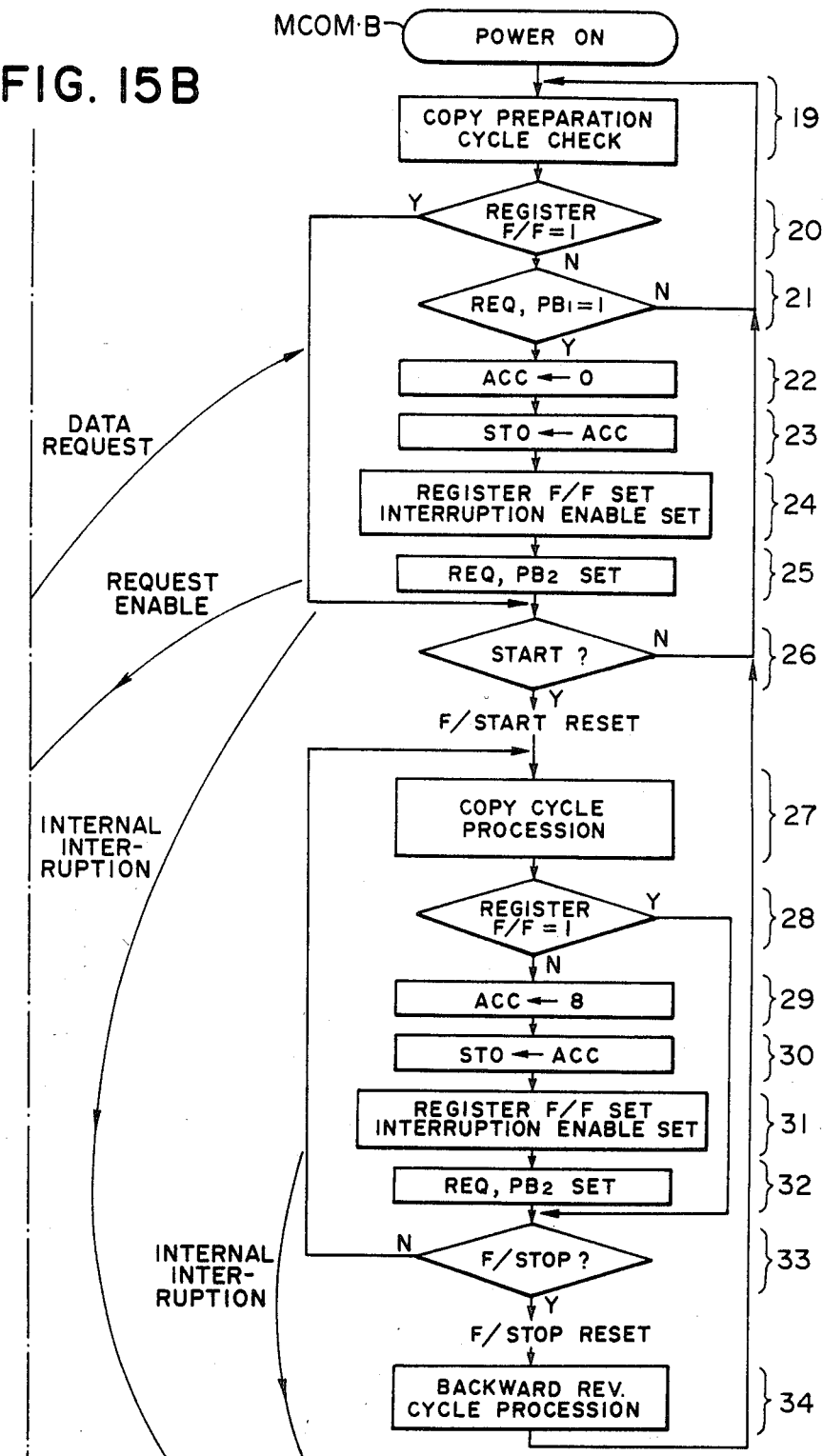

FIGS. 13 and 14 illustrate different embodiments of the control circuit of the copier shown in FIG. 2-1 combined with an automatic document feeder and a sorter, wherein the micro-computers MCOM.A and MCOM.B are the same as explained, before while MCOM.C and MCOM.D are provided for controlling respectively the automatic document feeder and the sorter. In the block diagram shown in FIG. 13 the serial shift registers for data transfer are mutually connected in series, while the shift registers in FIG. 14 are connected in parallel for achieving a faster data transfer to the automatic document feeder and the sorter, in comparison with the serial connections shown in FIG. 13.

The micro-computer MCOM.C of the automaitc document feeder controls a document feed roller etc. for ejecting an original present on the original carriage and setting a succeeding original according to a timing signal indicating the completion of copy counting transferred from MCOM.A through MCOM.B corresponding to the completion of a set number of scanning cycles of the optical system.

Also the micro-computer MCOM.D of the sorter terminates the sorter function upon detection of a sheet jamming in the sorter, and transfers the sorter jamming detection data to MCOM.A for causing a corresponding display and to MCOM.B for interrupting the copier function. Also MCOM.D is capable of enabling or disabling the sorter function in response to data concerning the sorter selection signal transferred from MCOM.A.

FIG. 15 shows a control flow chart utilizing the micro-computer MCOM.A for controlling the function of keys and display units shown in FIG. 2-2 and the micro-computer MCOM.B principally for copy sequence control.

Upon turning on of the main switch SW, MCOM.A executes the steps in the main flow chart. Step 1 performs the storage of the numbers entered by the keys 41 into the memory and the corresponding displays. Step 2 identifies the state of the aforementioned register flip-flop 302 shown in FIG. 4, indicating whether the aforementioned shift register in MCOM.A is in the course of data transfer. The program does not proceed if it is in the course of data transfer, but otherwise proceeds to the Step 3, which identifies the actuation of the copy start key by detecting a flag to be set in the Step 1 in response to the actuation of said copy start key. In case the copy start key 40 has been actuated, the program proceeds to the Step 4 to set the copy start data "13" in the accumulator ACC and, in the Step 5, to set said data in the shift register ST3 for transfer to MCOM.B.

Also in case the stop key 42 has been actuated, the MCOM.A detects said actuation in the Step 6, sets data "14" in the accumulator ACC in the Step 7 and sets said data in the shift register ST3 in the Step 5.

Subsequently the Step 8 sets the register flip-flop for enabling the data transfer from the shift register and releases the interruption enable signal E for setting the interruption flip-flop of MCOM.B. The Step 9 sets the output port PA1 to transmit the signal REQ-O to MCOM.B. The Step 10 identifies the entry of the signal REQ-E from MCOM.B, upon receipt of which the program proceeds to the Step 11 to reset the signal REQ-O. Then the data transfer from the output port SO is initiated in the Step 12.

The micro-computer MCOM.B for sequence control functions in the following manner. Upon turning on of the main switch, the Step 19 checks the copy preparation cycle, and the Step 20 checks the state of the register flip-flop in the same manner as in the Step 2, thus identifying the state of the shift register of MCOM.B and controlling the proceeding of the program. Then the Step 21 identifies the presence of the signal REQ-O for data transfer from MCOM.A and, in the presence of said signal the program proceeds to the Step 22 for setting the data indicating the function state of MCOM.B in the shift register as the preparation for transfer to MCOM.A in the Steps 22 to 24. The flow chart shown is an example of setting data "0" representing the stand-by state of MCOM.B in the register ST0. Other data to be transferred from MCOM.B to MCOM.A are shown in FIG. 12.

After said data setting in the shift register, the Step 25 sets the register flip-flop and the interruption enable signal, and also sets the output port PB2 to release the signal REQ-O for enabling data transfer. Then Step 26 identifies the transfer of the copy start instruction by the interruption routine, by detecting a flag F/START.

Now there will be explained a program interruption routine to be executed upon completion of the data transfer initiated by the Step 12 of MCOM.A. The interruption takes place almost simultaneously in MCOM.A and MCOM.B.

In the Step 13, MCOM.A sets the data in the shift register ST0 already transferred from MCOM.B in the accumulator ACC, and identifies the data in the accumulator in the Steps 14 and 17. In case ACC="0" indicating the stand-by state of MCOM.B is identified in the Step 14, a process flag is set in the Step 15 to enable the key entry in the control panel and the change of displays by the keys. Also if ACC="8" indicating the progress of copy cycle in MCOM.B is identified in the Step 17, a flag is set in the Step 18 to disable the key entry. Also the Step 16 resets the register flip-flop and the interruption enable signal.

Similarly MCOM.B shifts the data in the shift register to the accumulator in the Step 35. In case ACC="13" indicating the copy start instruction is identified in the Step 13, a flag F/START for starting the copy cycle is set in the Step 37. Also in case ACC="14" indicating the copy stop instruction is identified in the Step 40, a flag F/STOP for stopping the copy cycle is set in the Step 41. The Step 38 resets the register flip-flop and the interruption enable signal, and the Step 39 resets the signal REQ-E.

In this manner, if data "13" are contained corresponding to the register ST3 in the serial data transferred from MCOM.A, then MCOM.B identifies the flag F/START in the Step 26 and starts the copy cycle in the Step 27. Steps 28–32 are provided for identifying the transfer of a stop instruction. Step 33 checks a flag F/STOP. In the presence of a stop instruction the program proceeds to the Step 34 for immediately effecting the post-rotation cycle, which is otherwise conducted after the completion of a set number of copy cycles. Although the foregoing explanation has been limited to the data for copy start and copy stop, there are in fact employed many other data as shown in FIGS. 11 and 12, including the key entry and display, according to which the copying process is controlled.

Now there will be explained a control with three or more micro-computers having serial or parallel connection of the serial transfer means as shown in FIG. 13 or 14.

The data transfer means of each micro-computer is essentially the same as explained before, but each micro-computer is given an address number for enabling the identification of the address of each data, thus ensuring data transfer to a correct micro-computer. For this purpose the data to be transferred includes an address number of the micro-computer for receiving said data.

Figure 16:
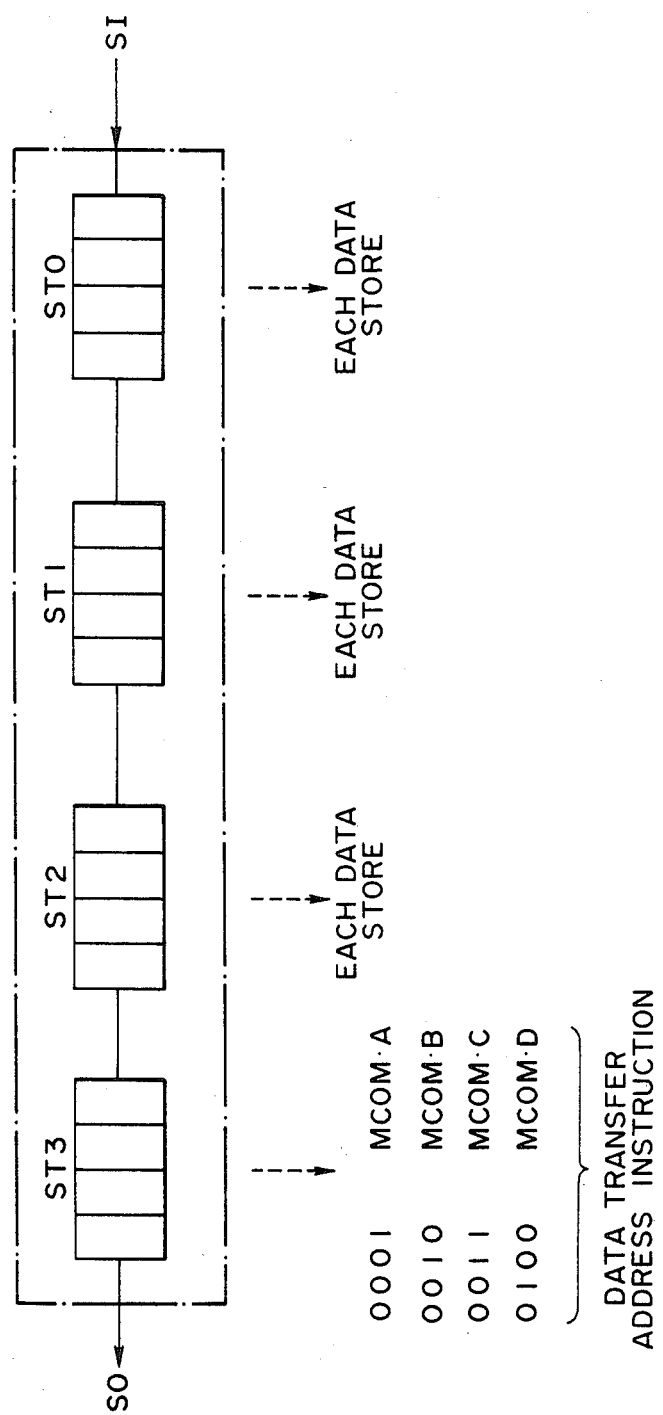
FIG. 16 is a diagram showing another embodiment of the control circuit.

FIG. 16 shows the data including the address number of the micro-computers, wherein the data corresponding to the register ST3 are used for indicating said address. In the present embodiment the ST3 data "0001" stands for MCOM.A, "0010" for MCOM.B, "0011" for MCOM.C, and "0100" for MCOM.D In this manner each micro-computer sets, in the register ST3, the address number of another micro-computer to which the data is to be transferred. At the data transfer, each micro-computer, in the interruption mode, checks the data ST3 serially transferred to identify whether the transferred data is addressed to itself, and, if so, receives and judges the succeeding data ST0–ST2.

Figure 17:
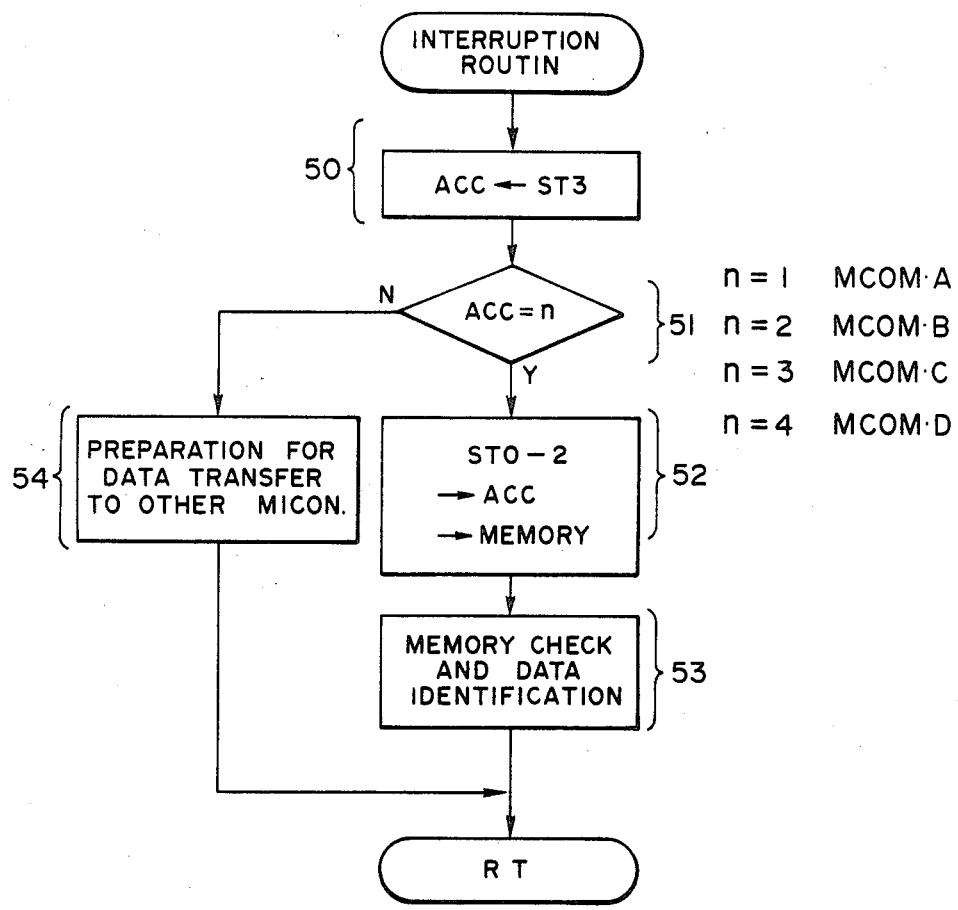
FIG. 17 is a control flow chart of the control circuit shown in FIG. 16.

The above-explained procedure is more detailedly shown in the flow chart in FIG. 17, indicating an interruption routine to be executed after the transfer of data. Each micro-computer shifts the data in the shift register ST3 to the accumulator in the Step 50, and judges the content of the accumulator in the Step 51. The accumulator content "1", indicates the data for MCOM.A, "2" for MCOM.B, "3" for MCOM.C and "4" for MCOM.D. In case the micro-computer identifies that the transferred data is addressed to itself, the Step 52 stores the contents of the shift registers ST0–ST2 into the data memory through the accumulator, and the Step 53 judges the content of the thus stored data for executing corresponding processes. Also in case the micro-computer identifies in the Step 51 that the transferred data is not addressed to it, the program proceeds to the Step 54 in which the thus transferred data are prepared for re-transfer to another micro-computer. The procedure of said re-transfer through the shift register is the same as the aforementioned Steps 4, 5, 6, 7, 8, 9, 10, 11 and 12, except that the address number of the micro-computer to which the data is destined has to be set in the register ST3. In this manner the data exchange among three or more micro-computers can be easily achieved through serial or parallel connection of the serial transfer means of said micro-computers. However in case of a parallel connection as shown in FIG. 14, MCOM.A alone functions as a central control and is required to execute the identifying steps for data address shown in FIG. 17. On the other hand, in case of serial connection as shown in FIG. 13 said identifying steps are required in all of micro-computers MCOM.A-MCOM.D. In this manner the parallel connection of the serial transfer means as shown in FIG. 14 is advantageous in certain aspects. Also the data transfer among the micro-computers can be advantageously conducted through optical fibers, in order to suppress the effect of perturbing noises.

In the circuits shown in FIGS. 7, 13 and 14, the micro-computer MCOM.A controls the copy number display 47, wait-time display 49, sheet jam display 50 and other displays E-H, automatic resetting of the computer power supply, and the process loads for a part of a copy cycle. More specifically MCOM.A lights the jam display 50 upon receipt of the jam data serially transferred from MCOM.B at a sheet jam detection therein. Also MCOM.A changes the indication of the copy number display 47 to indicate the sheet jam position and corrects the copy number at the sheet jamming in response to the data ST1 shown in FIG. 12. Also MCOM.A step advances the copy number display 47 upon receipt, from MCOM.B, of the signal BP indicating the start of reversing motion of the optical system and represented as ST0 data "9" as shown in FIG. 12. Furthermore, in response to the detection of a particular trouble by MCOM.B, the power supply to MCOM.A is turned off for a determined time and is then automatically re-opened thereby initializing the MCOM.A to execute the program for MCOM.A shown in FIG. 15 from the Step 1.

Figure 18:
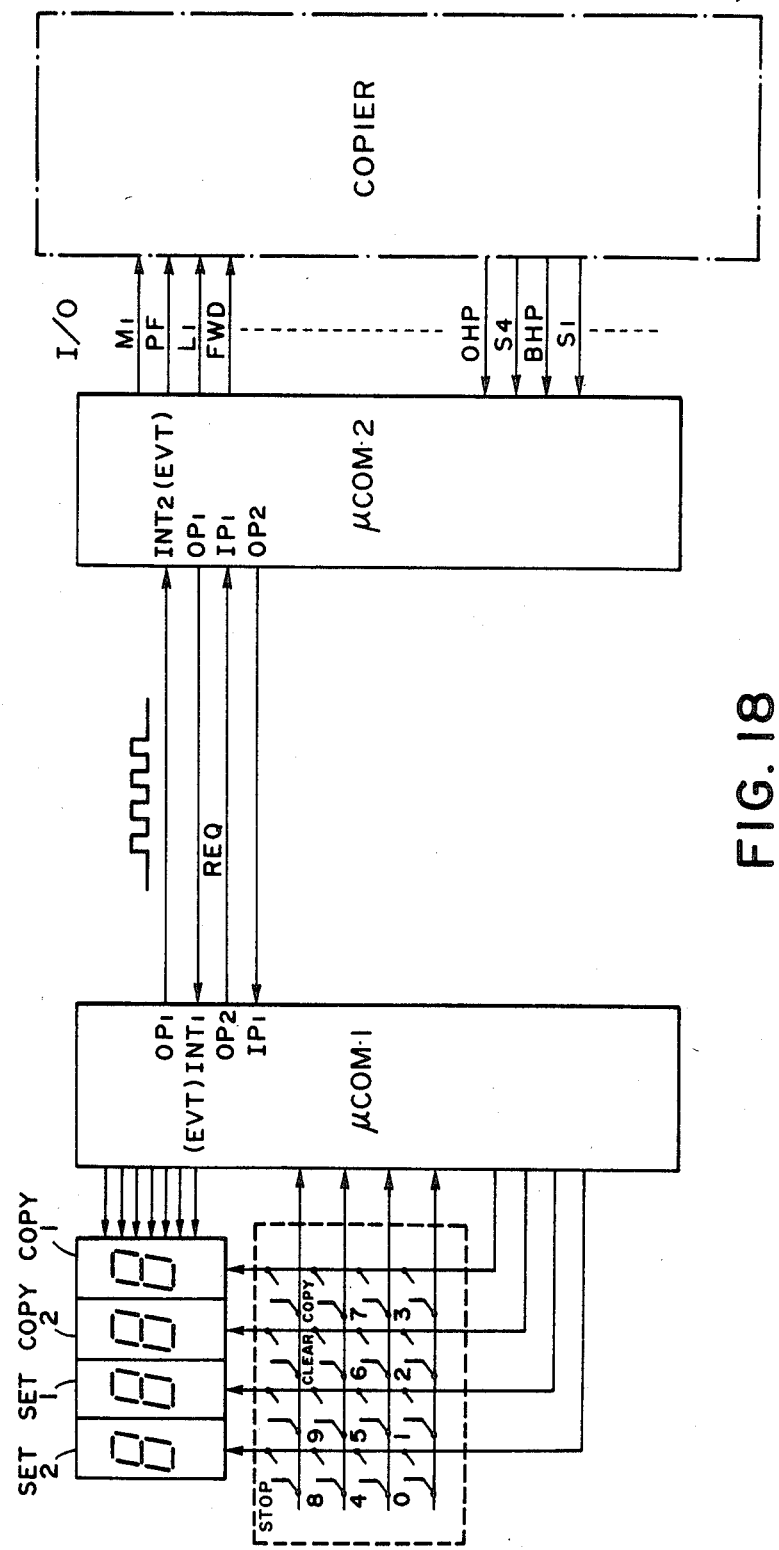
FIG. 18 is a circuit diagram showing another embodiment of the present invention.

Now FIG. 18 shows another embodiment of the control circuit utilizing two micro-computers, wherein μCOM1 and μCOM2 are one-chip micro-computers functionally corresponding to MCOM.A and MCOM.B shown in FIG. 7 and having similar read-only memory, random access memory and input/output ports. The present embodiment is intended to effect the copy data transfer utilizing the program interrupt port INT or the event counter port EVT of said micro-computers. Such micro-computer, upon receipt of a pulse signal at said interrupt port INT, interrupts the main program and preferentially executes an interrupt program. Also upon counting of a determined number of pulses received at the event counter port, EVT, the micro-computer interrupts the main program and preferentially executes the interrupt program.

Output ports OP1, OP2 of μCOM1 are respectively connected to an interrupt port INT2 and an input port IP1 of μCOM2 for data transfer from μCOM1 to μCOM2. Also output ports OP1 and OP2 of μCOM2 are respectively connected to an interrupt port INT1 and an input port IP1 of μCOM1 for data transfer from μCOM2 to μCOM1.

FIG. 19 is a timing chart of data transfer between the micro-computers. For example, in the case of data transfer from μCOM1 to μCOM2, a signal REQ is supplied from the output port OP2 of μCOM1 to the input port IP1 of μCOM2 to enable the interruption therein, whereby clock pulses are supplied from the output port OP1 of μCOM1 to the interrupt port INT2 of μCOM2, which in the interrupt program, identifies the data according to the number of clock pulses thus transferred. For example a pulse number "4" or "6" respectively indicates the copy start instruction or the copy stop instruction. The frequency of said clock pulses is determined by the times t1, t2 of timers contained in μCOM1.

Figure 20A:
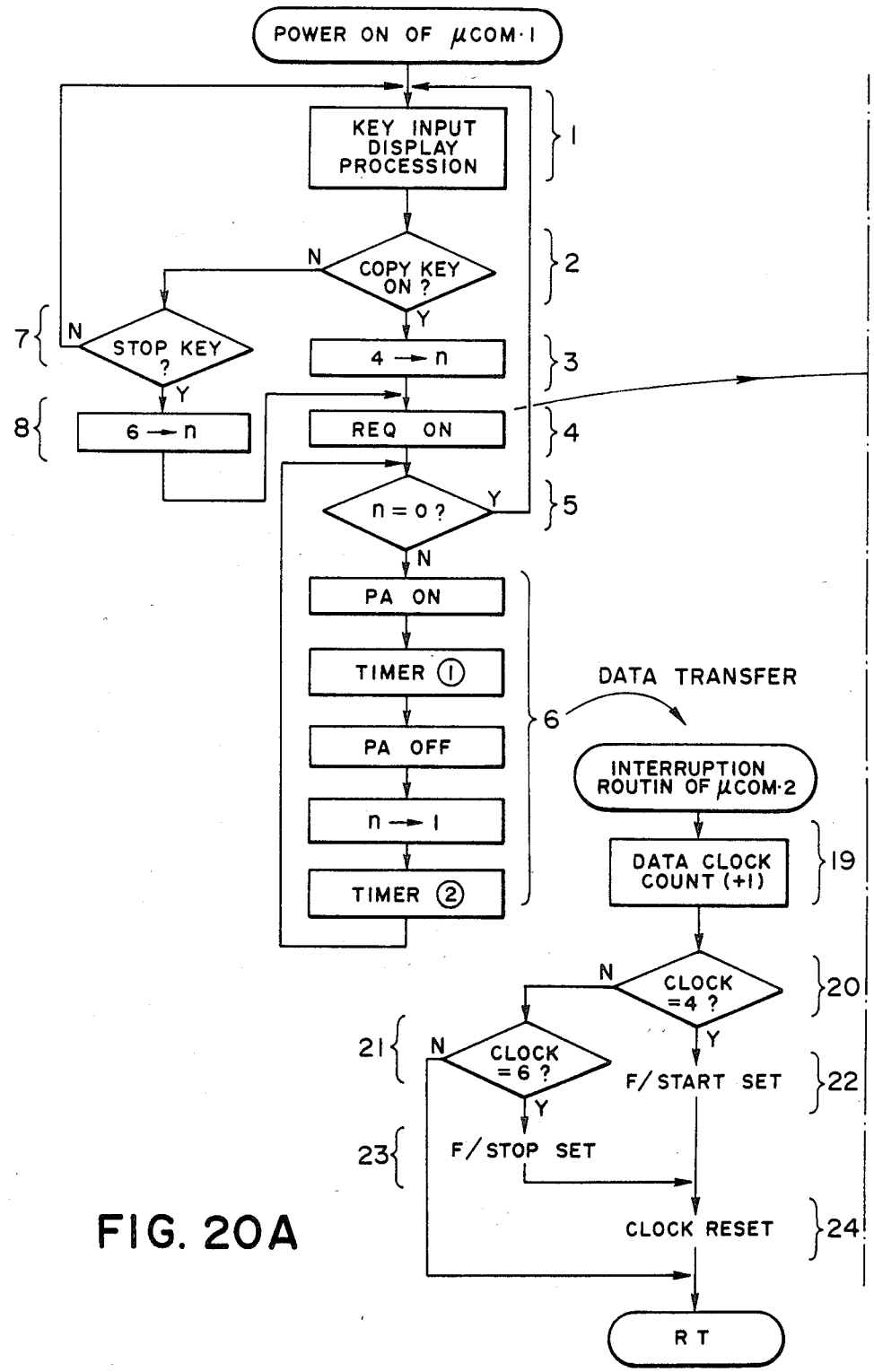
FIGS. 20A, 20B and 21 show in their combination flow charts showing data transfer control.
Figure 20B:
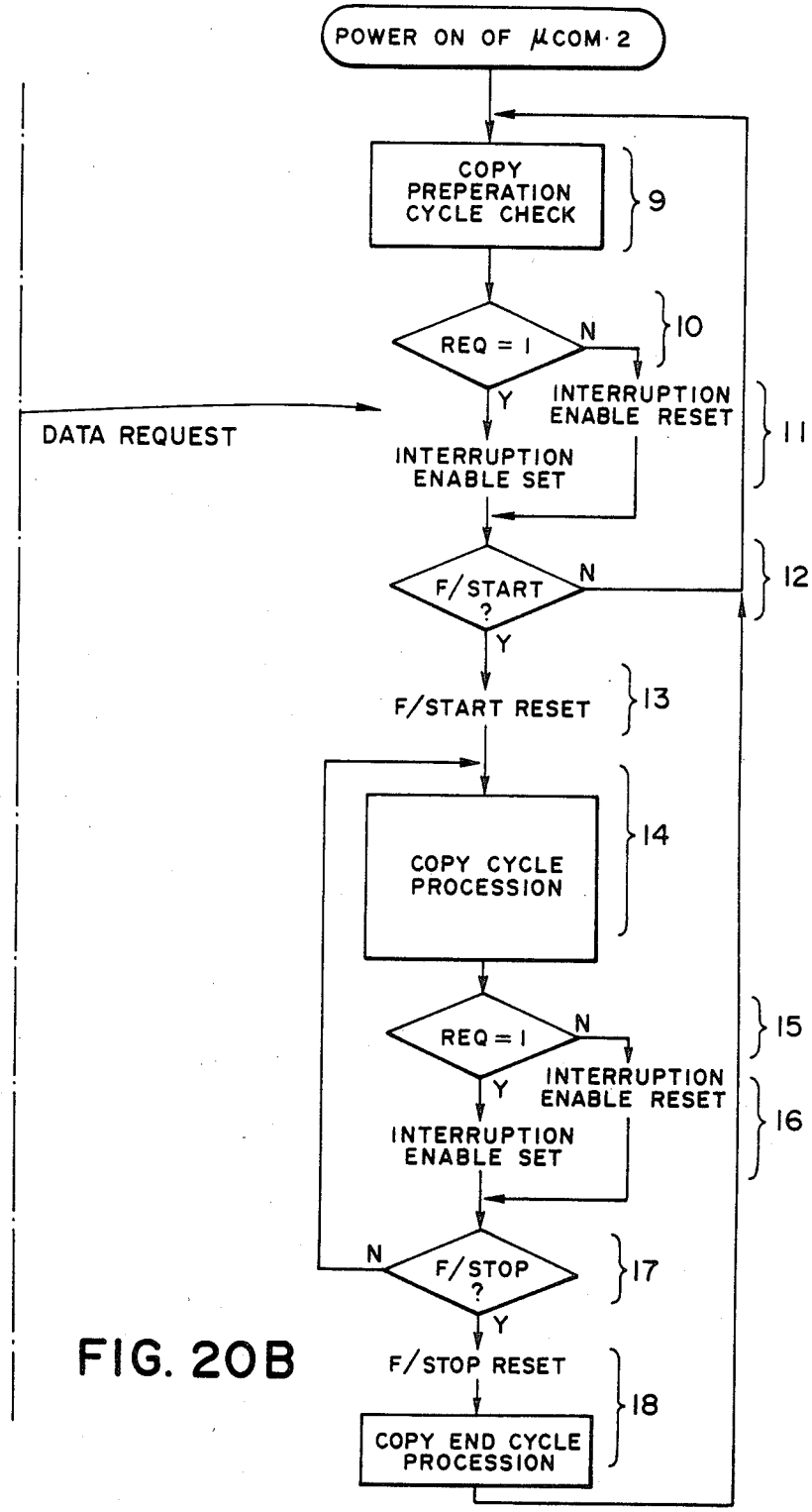

FIG. 20 shows a flow chart for the abovementioned data transfer and identification. Upon turning on of the power supply to μCOM1, the Step 1 senses the key entries for the copy set number and copy size and performs the corresponding displays, and the Step 2 identifies whether the copy start key has been actuated. If it is actuated the program proceeds to the Step 3 to set the clock pulse number "4" in a determined area in the random access memory, for transfer to μCOM2. The Step 4 sends a signal REQ from the output port OP2 of μCOM1 to the input port IP1 of μCOM2, thus advising the start of data transfer. Step 5 identifies whether the determined number of clock pulses has been transferred from the output port OP1 of μCOM1 to the interrupt port INT2 of μCOM2. This is achieved in the Steps 5 and 6 by reducing the content of counter memory for each pulse output, thus completing the output of pulses of the determined number.

Also in case the copy start key is not actuated in the Step 2, the program proceeds to the Step 7 to identify if the stop key has been actuated, and, if so, proceeds to the Step 4 after setting a clock pulse number "6". If the stop key is not actuated the program returns to the Step 1.

Also after turning on of the power supply, μCOM2 executes and checks the copy preparation cycle in the Step 9, including the drum pre-rotation for cleaning and the resetting of power line and micro-computer, and in the succeeding Steps 10–13 identifies whether the copy start instruction has been given. Step 10 identifies the request for data transfer between the micro-computer by judging the presence of signal REQ received at the input port IP1 or μCOM2, and in the Step 11 enables the interrupt port. The interruption routine is started upon receipt of clock pulses at the input port IP2, wherein the Step 19 counts the clock pulses, generated in the aforementioned Steps 5 and 6, by means of a counter memory in the random access memory. The succeeding Steps 20, 21 identify whether the data thus transferred from μCOM1 is a copy start instruction or a stop instruction according to the pulse number "4" or "6", and a flag F/START in case of the copy start instruction or a flag T/STOP in case of the copy stop instruction is set respectively in the Step 22 or 23. The program resets the clock pulses counted in the Step 24 and returns to the main program. Upon identification of the flag F/START in the Step 12, the Step 13 resets said flag and the Step 14 initiates the copy cycle including the steps of charging, exposure, image transfer, charge elimination and image fixing. In the above-explained procedure, erroneous identification of a pulse number is avoided because the period from the Step 19 to the identification of pulse number is selected is longer than the pulse interval t2.

The succeeding Steps 15 to 17 identify the copy stop instruction in the same manner as in the aforementioned Steps 10 to 12, and, if the stop instruction is identified, the Step 18 resets the flag F/STOP and executes the copy end cycle including the drum post-rotation.

Figure 21:
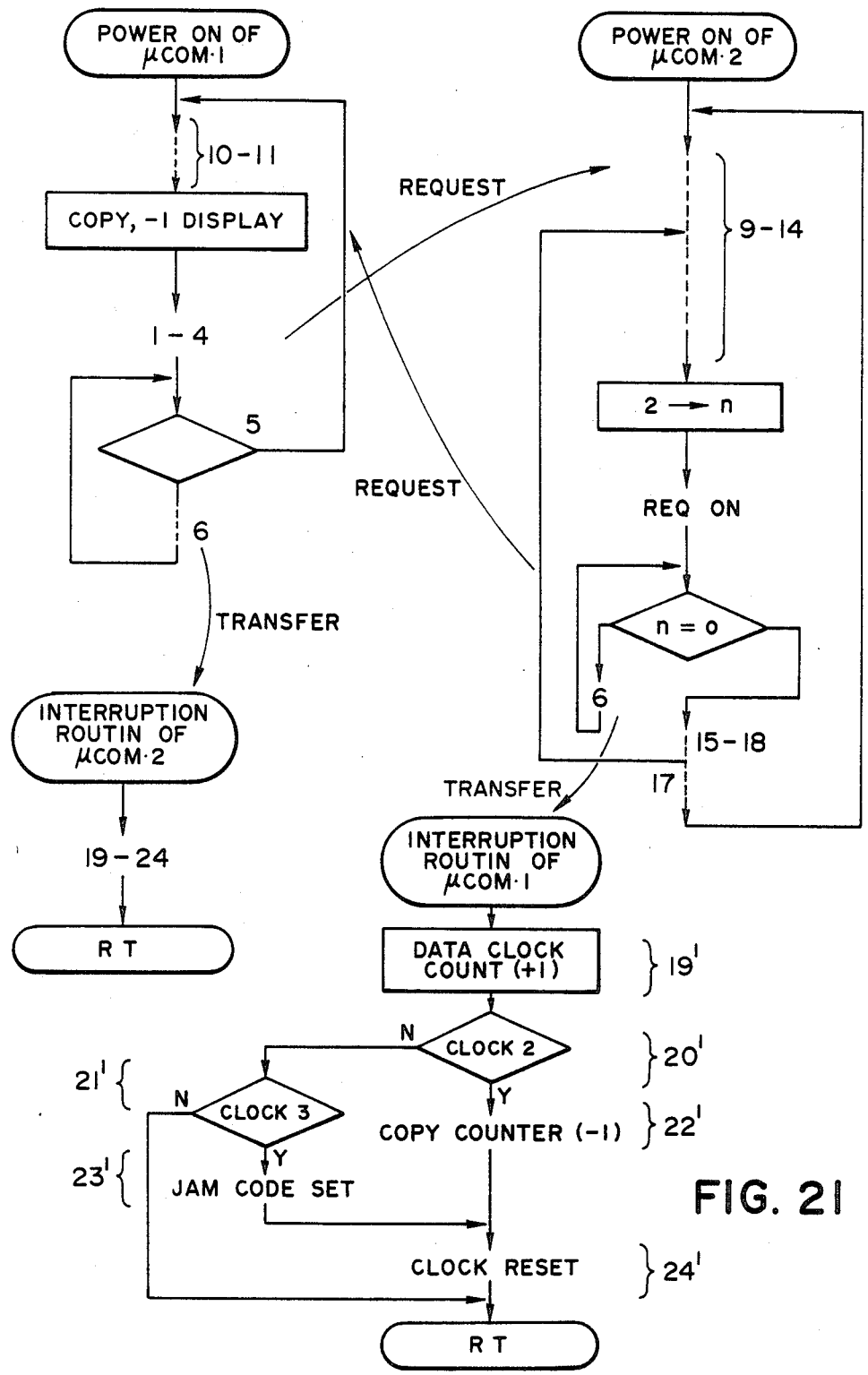

FIG. 21 shows a control flow chart in case of transferring two clock pulses from μCOM2 to μCOM1 as the count signal data in the copy cycle. The μCOM1 judges said data simultaneously with the receipt thereof and step reduces the number displayed on the copy display unit 47. Said data is transferred simultaneously with the start of the transfer sheet from the cassette in each copy cycle. The data transfer procedure will be apparent from FIG. 21, wherein the Steps 19'–24' are provided for the interruption flow in μCOM1 and are executed in a similar manner as explained in the foregoing. The Steps of the main flow corresponding to those in FIG. 20 are represented by the same numbers. Also a pulse number "3" indicating sheet jamming is identified in the interruption routine in μCOM1, the copy number display 47 is changed from a numeral to a mark " ⊓ " as explained in the foregoing.

Figure 22:
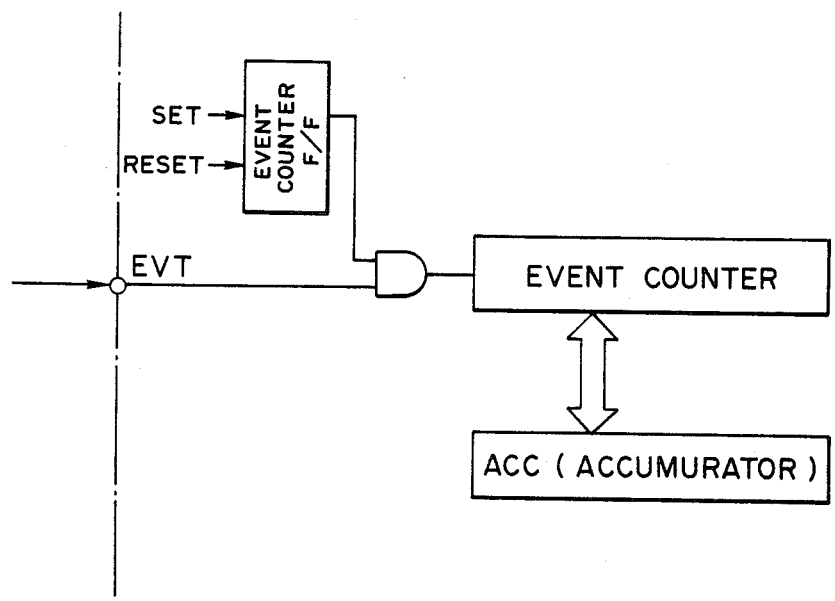
FIG. 22 is a block diagram showing a circuit in the micro-computer.
Figure 23:
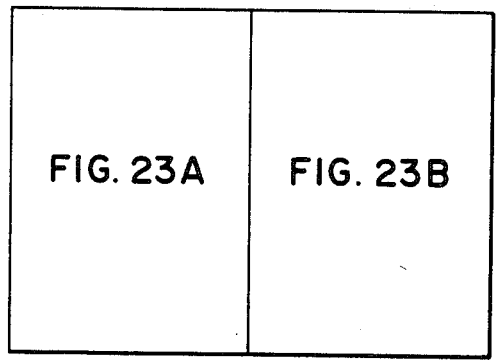
FIG. 23 illustrates a connecting relation between FIGS. 23A and 23B.
Figure 23A:
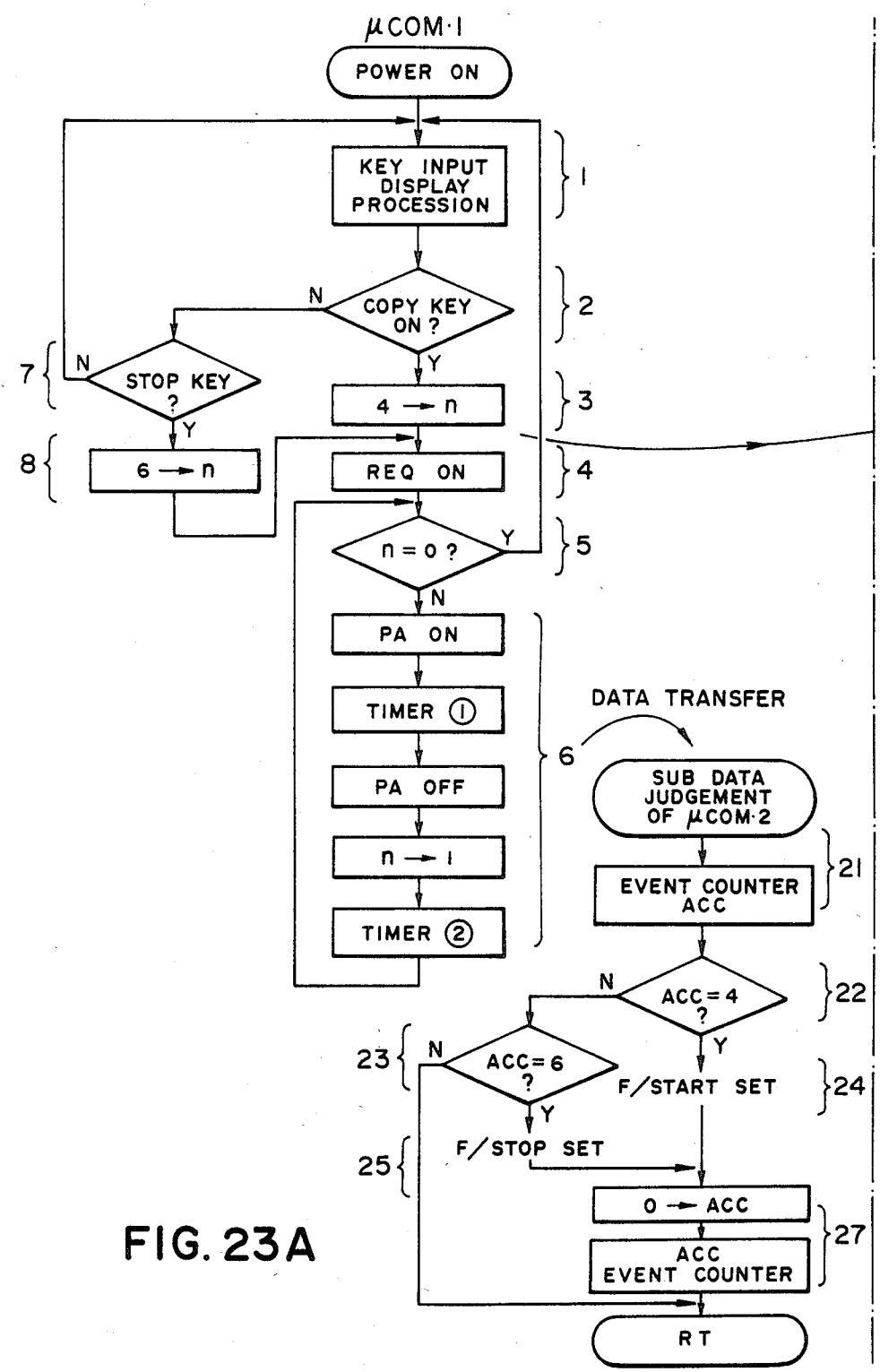
FIGS. 23A, 23B and 24 show in their combination flow charts showing data transfer control.
Figure 23B:
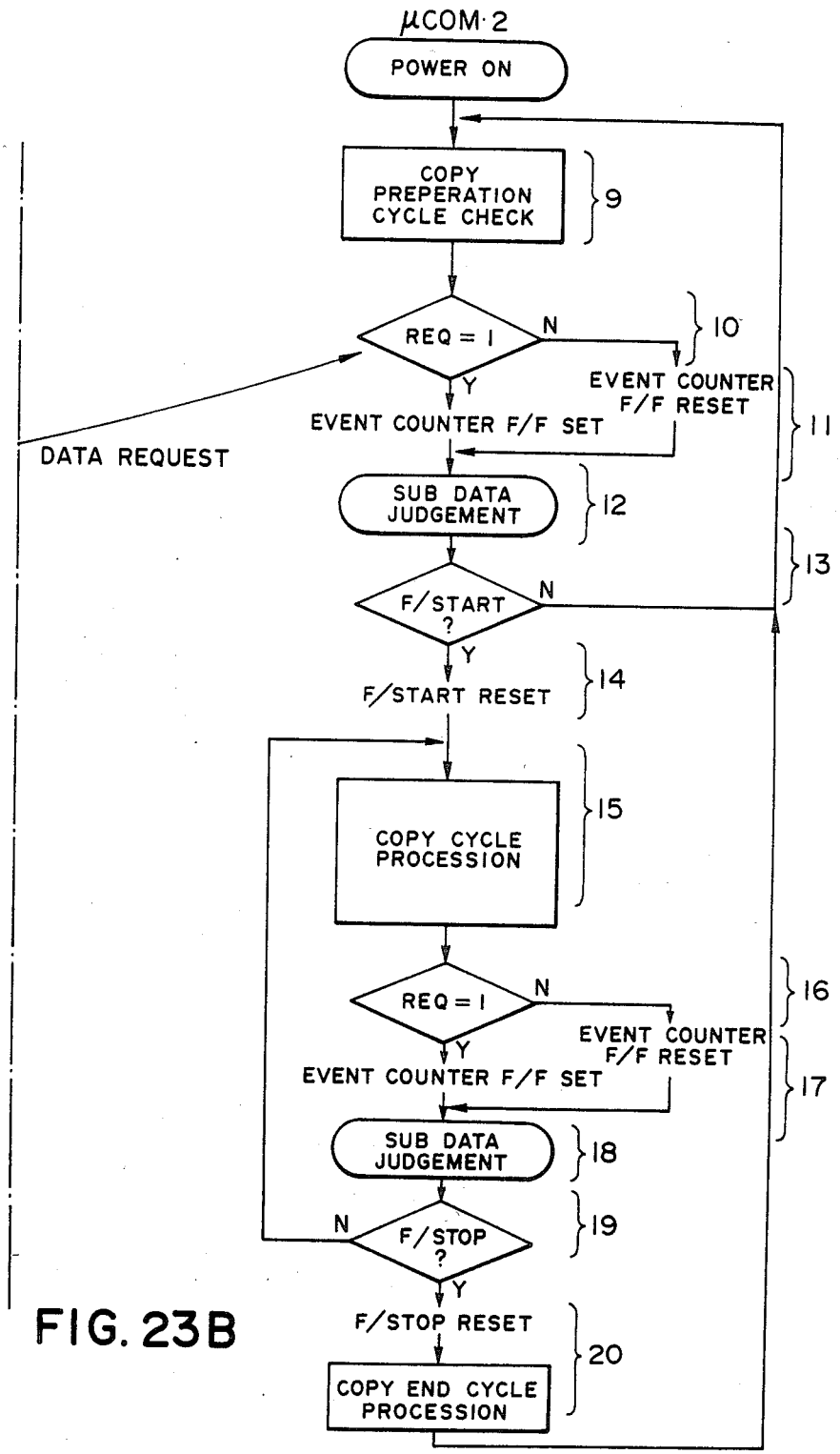
Figure 24:
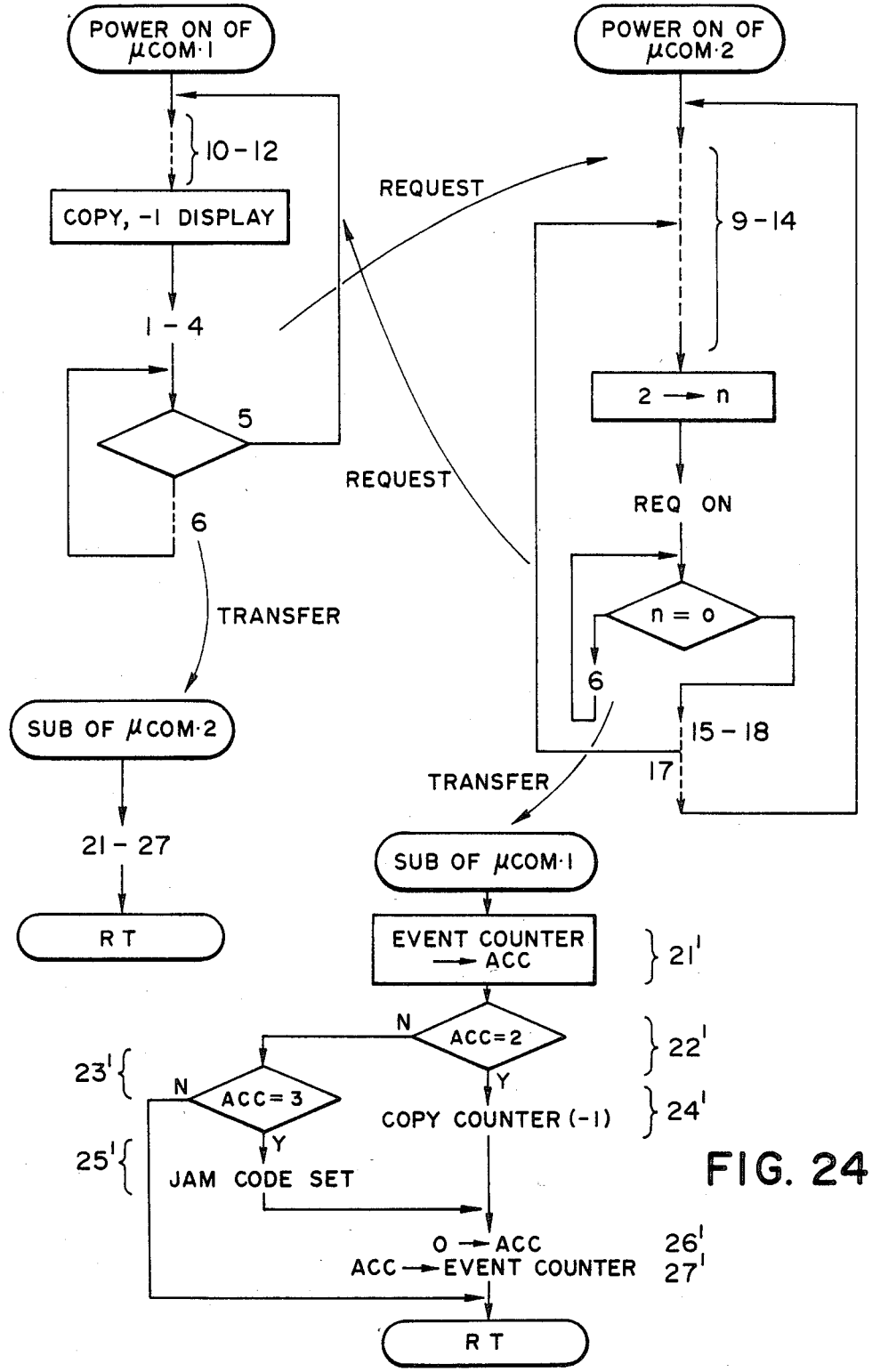

Now FIGS. 22–24 show an embodiment of data transfer by the event counter port EVT.

An event counter in a micro-computer automatically counts up or down by hardware at the leading end or trailing end of each clock pulse received at the input port EVT. As shown in FIG. 22, the event counter is connected with the accumulator ACC through an internal bus line of the micro-computer, so that the count state can be read by said accumulator. Also an event counter flip-flop is provided for setting or resetting by an instruction to be given by an unrepresented central processing unit.

The timing chart for data transfer is the same as shown in FIG. 19.

FIG. 22 shows the control flow chart for said data transfer. The Steps of μCOM1 after the turning on of the power supply are the same as those for μCOM1 in FIG. 20. Also the Steps of the copy preparation cycle for μCOM2 are the same as those shown in FIG. 20. μCOM1 performs the identification of the copy start instruction in the Steps 10–13. The Step 10 judges the presence of the request for data transfer between the micro-computers by identifying the signal REQ received at the input port IP1 of μCOM2, and the Step 11 sets or resets the event counter flip-flop respectively when said signal REQ is at the level-1 or level-0. Subsequently the Step 12 executes the sub-data judgement routine. Step 21 shifts the clock pulse count stored in the event counter to the accumulator, and Steps 22 and 23 identify whether the data transferred from μCOM1 are a copy start instruction or a copy stop instruction, according to the number of clock pulses "4" or "6" received by μCOM2. Thus, a flag F/START in case of the copy start instruction or a flag F/STOP in case of the copy stop instruction is set respectively in the Step 24 or 25. Then the Step 26, 27 clears the accumulator and shifts the content thereof to the event counter. If the flag F/START is identified in the succeeding Step 13, the Step 14 resets said flag and the copy cycle is initiated in the same manner as explained in FIG. 20. Then copy stop instruction is identified in the same manner as in the Steps 10–13, and the program proceeds to the post-rotation cycle as explained in FIG. 20.

FIG. 24 shows a control flow chart in case of transferring two or three clock pulses from μCOM2 to the event counter port EVT1 of μCOM1 and judging said pulses therein as the copy cycle count data or sheet jamming data. μCOM1 counts said pulses, identifies the count of said pulses in the Steps 21'–27' similar to the Steps 21–27 and performs the numeral or code display on the display unit 47 in the manner as explained in the foregoing.

Although the foregoing explanation has been limited to the cases of copy start and copy stop instructions, the data transfer between micro-computer is naturally not limited to these cases.

As detailedly explained in the foregoing, the foregoing embodiments allows data transfer among plural micro-computers for controlling a copier in the form of serial pulses and enables data identification by the pulse mode such as the pulse number of pulse code, thereby reducing the number of input/output ports required for control while ensuring effecient data transfer.

I claim:

1. A reproduction system, comprising:
   plural operable means for image reproduction, which includes key means for instruction and display means;
   first one chip computer means provided with a data memory, a processor and a memory storing a program for operation control of some of said operable means;
   second one chip computer means provided with a data memory, a processor and a memory storing a program for operation control of some other of said operable means;
   a data line coupled between said first and second computer means; and
   means adapted for transferring, one of said computer means to the other, the data necessary for operation control by said other computer means, wherein said transferred data is in a form of serial pulses, and wherein said serial pulses are transferred through said data line coupled between said first and second computer means.

2. A reproduction system according to claim 1, wherein said operable means comprises means for displaying the reproduction state, means for entering instruction for reproduction and means for executing a reproduction process; wherein said first one chip computer means is adapted to effect operation control of said display means and entry control of said entering means, while said second one chip computer means is adapted to effect sequence control of said process executing means.

3. A reproduction system according to claim 1, wherein said transferring means is adapted to transfer plural data in serial manner to said other computer means.

4. A reproduction system according to the claim 1, wherein said transferring means is adapted to transfer said data to an interrupt port or an event counter port of said computer means.

5. A reproduction system, comprising:
   plural operable means for image reproduction, which includes a display means and a key means for instruction;
   first computer means provided with a memory storing a program for operation control of some of said operable means;
   second computer means provided with a memory storing a program for operation control of some other of said operable means;
   third computer means provided with a memory storing a program for operation control of still some other of said operable means; and
   means adapted for transferring data necessary for the operation control from said first computer means to said third computer means through said second computer means.

6. A reproduction system according to claim 5, wherein said transferring means is adapted to serially transfer plural data among said computer means.

7. A reproduction system, comprising:
   plural operable means for image reproduction, which includes a display means and a key means for instruction;
   first computer means provided with a memory storing a program for operation control of some of said operable means;
   second computer means provided with a memory storing a program for operation control of some other of said operable means;
   third computer means provided with a memory storing a program for operation control of still some other of said operable means; and
   means adapted for connecting said second and third computer means in parallel to a particular data output line of said first computer means, wherein said first, second and third computer means have a common channel connected therebetween through which data are transferred therebetween.

8. A reproduction system according to the claim 7, wherein said transferring means is adapted to serially transfer plural data among said computer means.

9. A reproduction system according to claim 5, wherein said first computer means is adapted to effect at least the display control of the copy number, and said second and third computer means are adapted to respectively effect the process sequence control of the reproduction process, automatic feed control originals and sorting of copy sheets.

10. A reproduction system according to claim 7, wherein said first computer means is adapted to effect at least the display control of the copy number, and said second and third computer means are adapted to respectively effect the process sequence control of the reproduction process, automatic feed control originals and sorting of copy sheets.

11. A reproduction system comprising:
plural copy-process operation means for image reproduction each of which includes a display means and a key means for instruction;
first computer means provided with a memory storing a program for control of at least one of said operation means;
second computer means provided with a memory storing a program for control of at least one other of said operation means; and
means for transferring to said first computer means from said second computer means the data necessary for operation control by said first computer means in a form of serial pulses;
wherein said first computer means identifies an improper state of one of said plural copy-process operation means, and said second computer means provides a data signal based on said serial pulses transmitted under the improper state.

12. A reproduction system comprising:
plural copy-process operation means for image reproduction;
first computer means provided with a memory storing a program for control of at least one of said operation means;
second computer means provided with a memory storing a program for control of at least one other of said operation means; and
means for transferring to said first computer means from said second computer means the data necessary for operation control by said first computer means in a form of serial pulses;
wherein said transferring means has a serial pulse data line and a pre-communication line independent from said serial pulse data line, and said first and second computer means perform a transference of said serial pulses through said data line therebetween after transmitting and receiving predetermined signals through said pre-communication line for data transfer preparation.

13. A reproduction system comprising:
plural copy-process operation means for image reproduction;
first one-chip computer means provided with a memory storing a program for control of at least one of said operation means;
second one-chip computer means provided with a memory storing a program for control of at least one other of said operation means; and
means for transferring to said first one-chip computer means from said second one-chip computer means the data necessary for operation control by said first one-chip computer means in a form of serial pulses;
wherein said first and second one-chip computer means store said serial pulses transferred from each other and identify the pulse data to form a data signal.

14. A reproduction system comprising:
plural copy-process operation means for image reproduction;
first computer means provided with a memory storing a program for control of at least one of said operation means;
second computer means provided with a memory storing a program for control of at least one other of said operation means; and
means for transferring to said first computer means from said second computer means the data necessary for operation control by said first computer means in a form of serial pulses;
wherein said first and second computer means count pulses relating to transference of said data to form a data signal.

15. An image forming system comprising:
a plurality of computers, one of which effects an image forming operation; and
transfer means for transferring date for image processing or system control from a first one of said computers through a second said computer to a third said computer, and for transferring the data from said third computer to said first computer while bypassing said second computer, wherein said second computer identifies whether or not the data from said first computer relates to itself.

16. An image forming system comprising:
a plurality of computers one of which effects an image forming operation; and
transfer means for transferring data from a first one of said computers to a second said computer in a form of serial pulses to effect an image formation operation, and for transferring data representative of a machine condition from said second computer to said first computer in a form of serial pulses.

17. An image forming system comprising:
two micro-computers; and
means for transferring data for image formation control in the form of serial pulses from one of said computers to the other computer to effect an image forming operation by said other computer,
wherein said transferring means performs a signal exchange between the computers; one of said computers includes a means for performing a check, in accordance with said signal exchange, as to whether or not the other of said computers is ready for receiving; and, after the signal exchange, the data pulses are transferred; and, said other computer includes means for identifying the number of said serial pulses or the arrangement thereof to form a data signal.

* * * * *

UNITED STATES PATENT AND TRADEMARK OFFICE
CERTIFICATE OF CORRECTION

PATENT NO. : 4,556,310

DATED : December 3, 1985

INVENTOR(S) : SHUNICHI MASUDA

It is certified that error appears in the above-identified patent and that said Letters Patent is hereby corrected as shown below:

COLUMN 6, line 12, change "interrupts" to read --interrupt--.

COLUMN 11, line 16, change "thorugh" to read --through--.

COLUMN 14, line 3, change "automaitc" to read --automatic--.

COLUMN 19, line 40, change "effecient" to read --efficient--.

FIG. 15C should be added to the drawings.

Signed and Sealed this

Fourth Day of November, 1986

[SEAL]

*Attest:*

DONALD J. QUIGG

*Attesting Officer*     *Commissioner of Patents and Trademarks*

UNITED STATES PATENT AND TRADEMARK OFFICE
CERTIFICATE OF CORRECTION

PATENT NO. : 4,556,310         Page 2 of 2
DATED      : December 3, 1985
INVENTOR(S): SHUNICHI MASUDA It is certified that error appears in the above-identified patent and that said Letters Patent is hereby corrected as shown below:

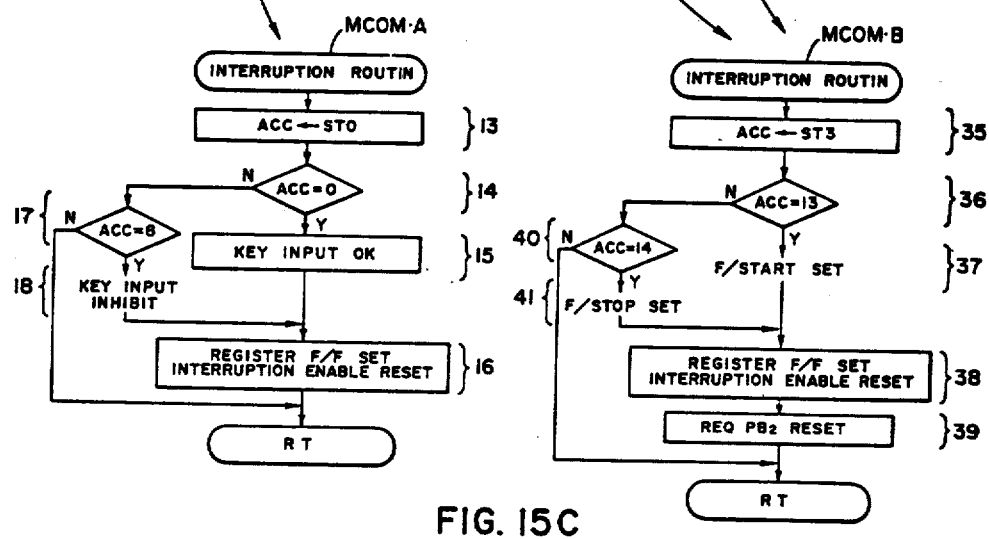

FIG. 15C